United States Patent [19]

Obana et al.

[11] Patent Number: 5,001,711
[45] Date of Patent: Mar. 19, 1991

[54] COMPLEX MULTIPLEXER/DEMULTIPLEXER APPARATUS

[75] Inventors: Yuji Obana, Shimotsuga; Masanori Hiramoto, Yuki, both of Japan

[73] Assignee: Fujitsu Limited, Kawasaki, Japan

[21] Appl. No.: 389,264

[22] Filed: Aug. 3, 1989

[30] Foreign Application Priority Data

Aug. 3, 1988 [JP] Japan .................. 63-195096

[51] Int. Cl.⁵ ............................................. H04J 3/07
[52] U.S. Cl. ...................................... 370/112; 370/84; 370/102
[58] Field of Search ............... 370/84, 112, 102, 110.1

[56] References Cited

U.S. PATENT DOCUMENTS

| | | | |
|---|---|---|---|
| 4,224,473 | 9/1980 | Kaul et al. | 370/102 |
| 4,589,108 | 5/1986 | Billy | 370/84 |
| 4,727,542 | 2/1988 | Rokugo et al. | 370/112 |
| 4,807,221 | 2/1989 | Stummer | 370/112 |
| 4,811,341 | 3/1989 | Fujimoto et al. | 370/112 |

FOREIGN PATENT DOCUMENTS

| | | |
|---|---|---|
| 55-156441 | 12/1980 | Japan . |
| 62-265829 | 11/1987 | Japan . |
| 86/05939 | 10/1986 | World Int. Prop. O. .......... 370/112 |

Primary Examiner—Douglas W. Olms
Assistant Examiner—Alpus H. Hsu
Attorney, Agent, or Firm—Staas & Halsey

[57] ABSTRACT

A complex multiplexer/demultiplexer apparatus which converts input low order group data signals to middle order group data signals and multiplexes them to high order group data signals and converts high order group data signals to middle order group data signals and demultiplexes them to low order group data signals, wherein a plurality of low order group channels are processed by multiplexing and demultiplexing at a second clock bit synchronized with a first clock on the high order group side, the second clock including empty bits, and the bit rate being set lower than the first clock, and signal speeds between each of first multiplexers and a second multiplexer and between a first demultiplexer and each of second demultiplexers are converted by insertion and deletion of the empty bits which may have inserted therein additional information.

38 Claims, 17 Drawing Sheets

COMPLEX MULTIPLEXER/DEMULTIPLEXER APPARATUS

BACKGROUND OF THE INVENTION

1. Field of the Invention

The present invention relates to a complex multiplexer/demultiplexer apparatus, more particularly relates to a multiplexer/demultiplexer apparatus which converts low order group data signals to middle order group data signals to multiplex high order group data signals and converts high order group data signals to middle order group data signals to demultiplex low order data signals.

Telecommunications multiplexer/demultiplexer apparatuses used for exchange systems etc. are able to multiplex a plurality of low order group data signals to obtain a high order group data signal and to demultiplex a high order group data signal to obtain a plurality of low order group data signals.

Here, low order group data signals mean, for example, first order group data signals, while middle order group data signals and high order group data signals mean, respectively, for example, second order group data signals and third order group data signals.

2. Description of the Prior Art

As explained in detail later, in the conventional complex multiplexer/demultiplexer apparatuses (hereinafter simply referred to as MUX/DEMUX apparatuses), in the multiplexer part, the clocks used by the first multiplexer units for performing multiplexing from low order groups to middle order groups, for example, seven first multiplexer units corresponding to seven channels, were supplied individually from a second multiplexer unit which performed multiplexing of middle order groups to high order groups. The same was true in the demultiplexer part. The timing clocks used by the second demultiplexer units performing multiplexing from middle order groups to low order groups, for example, seven second demultiplexer units corresponding to seven channels, were supplied independently from the first demultiplexer units performing demultiplexing from high order groups to middle order groups.

Therefore, while there were demands for making conventional multiplexer/demultiplexer apparatuses by a plurality of LSI's (large scale integrated circuits), there was a problem in that they could not be easily constructed by LSI's. The reason was that the number of input/output pins of individual LSI's is fixed and if the number of input/output pins required for inputting and outputting seven channels worth of timing clocks increased, the number of input/output pins for the inherent multiplexing/demultiplexing data processing would end up reduced.

SUMMARY OF THE INVENTION

Therefore, the present invention has as its object the provision of a complex multiplexer/demultiplexer apparatus which enables a large reduction in the number of timing clock lines connecting the high order group side multiplexer unit and demultiplexer unit to the low order group side multiplexer unit and demultiplexer unit.

To achieve the above-mentioned object, the present invention provides a complex multiplexer/demultiplexer apparatus which includes:

a plurality of first multiplex means which multiplex low order group data signals to convert them into middle order group data signals, a second multiplex means which multiplexes the middle order group data signals to convert them into high order group data signals, a first demultiplex means which demultiplexes the input high order group data signals to convert them into middle order group data signals, a plurality of second demultiplex means which demultiplex the middle order group data signals to convert them into low order group data signals, and a clock generating means which supplies the timing clocks required by the above means, the multiplexing in the plurality of first multiplexing means being performed based on a common timing clock synchronized with the timing clock used in the multiplexing in the second multiplexing means and the demultiplexing in the plurality of second demultiplexing means being performed based on a common timing clock synchronized with the timing clock used in the multiplexing in the second multiplexing means.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

Before describing the embodiments of the present invention, the related arts and the disadvantages therein will be described with reference to the related figures.

Figure 1:
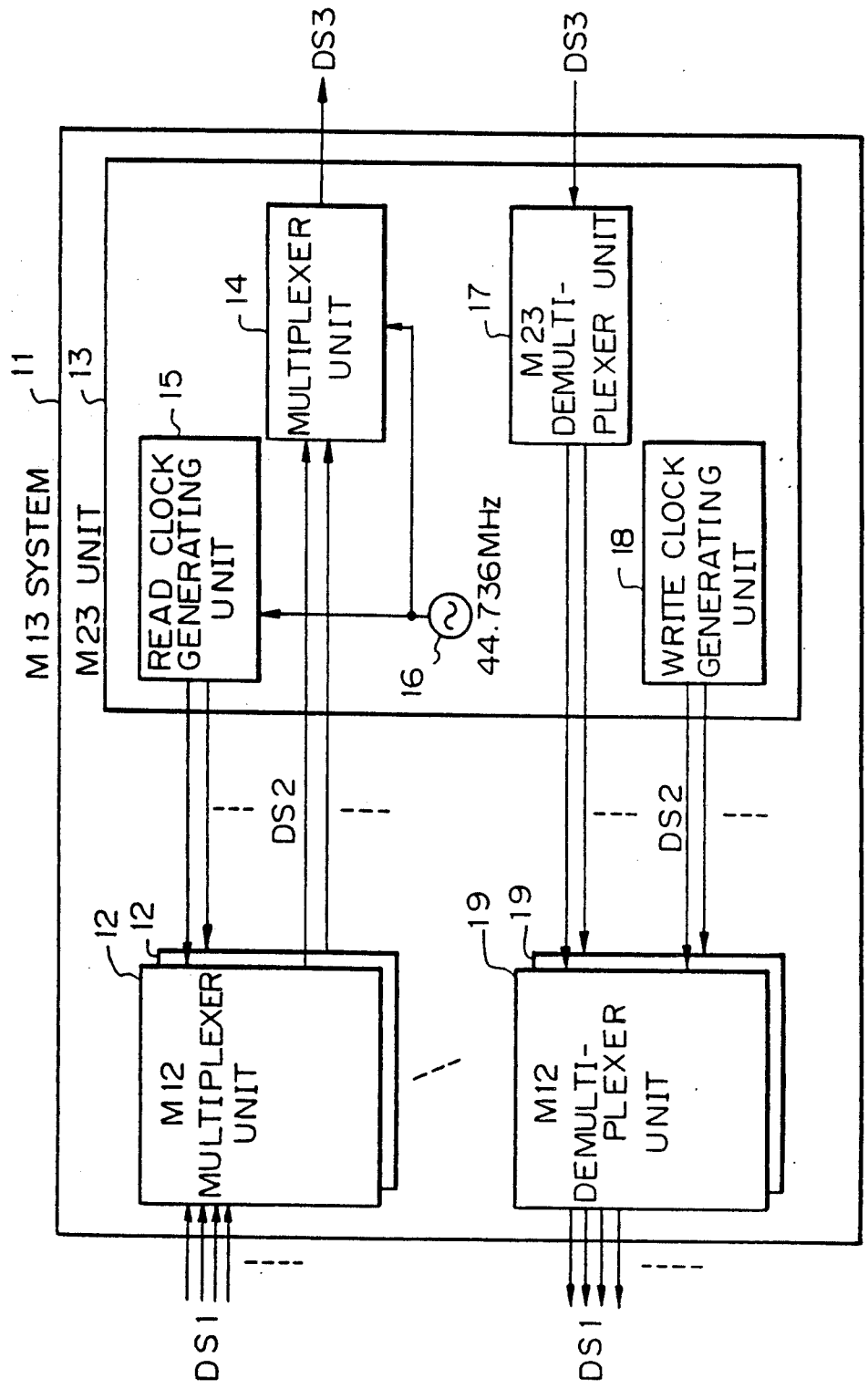
FIG. 1 is a block diagram of an example of the constitution of a conventional complex multiplexer/demultiplexer apparatus.

FIG. 1 is a block diagram of an example of the constitution of a conventional complex multiplexer/demultiplexer apparatus. The figure shows the constitution of the telecommunications multiplexer/demultiplexer apparatus (M13 system) which performs multiplexing and demultiplexing between first order group data signals DS1 and third order group data signals DS3.

In the figure, the M13 system 11 is provided with seven M12 multiplexer units 12 which multiplex 28 supplied first order group data signals DS1 into seven second order group data signals DS2, seven M12 demultiplexer units 19 which demultiplex the seven second order group data signals DS2 into 28 first order group data signals DS1, and an M23 unit 13 which multiplexes seven second order group data signals DS2 into one third order group data signal DS3 and demultiplexes one third order group data signal DS3 into seven second order group data signals DS2.

Further, the M23 unit 13 is provided with a clock source 16 which generates basic clock signals of 44.736 MHz, a read clock generating unit 15 which prepares shift clock signals for obtaining synchronization with the output (second order group data signals) of the M12 multiplexer units 12, an M23 multiplexer unit 14 which performs multiplexing of signals, an M23 demultiplexer 17 which performs demultiplexing of signals, and a write clock generating unit 18 which prepares shift clock signals for obtaining synchronization of the signals supplied to the M12 demultiplexer units 19.

When performing multiplexing of the signals by the M13 system 11, first, the read clock generating unit 15 prepares shift clock signals (FIG. 2) which are supplied respectively to the M12 multiplexer units 12 based on the basic clock signals of 44.736 MHz generated by the clock source 16. The respective M12 multiplexer units M12 supply second order group data signals DS2 comprised of four first order group data signals DS1 multiplexed synchronized with the seven shift clock signals prepared by the read clock generating unit 15.

The M23 multiplexer unit 14 multiplexes the total of seven second order group data signals DS2 supplied from the M12 multiplexer units 12 and outputs a single third order group data signal DS3.

Further, when performing demultiplexing of signals by the M13 system 11, first, the M23 demultiplexer unit 17 demultiplexes the supplied third order group data signal DS3 into seven second order group data signals DS2 and supplies the same to the M12 demultiplexer units 19.

The write clock generating unit 18 prepares shift clock signals supplied to the M12 demultiplexer units 19 based on the reproduction clock signals extracted from the third order group data signals DS3.

In the M12 demultiplexer units 19, the second order group data signals DS2 output from the M23 demultiplexer unit 17 synchronized with the seven shift clock signals supplied from the write clock generating unit 18 are fetched and demultiplexed into four first order group data signals DS1.

Figure 2:
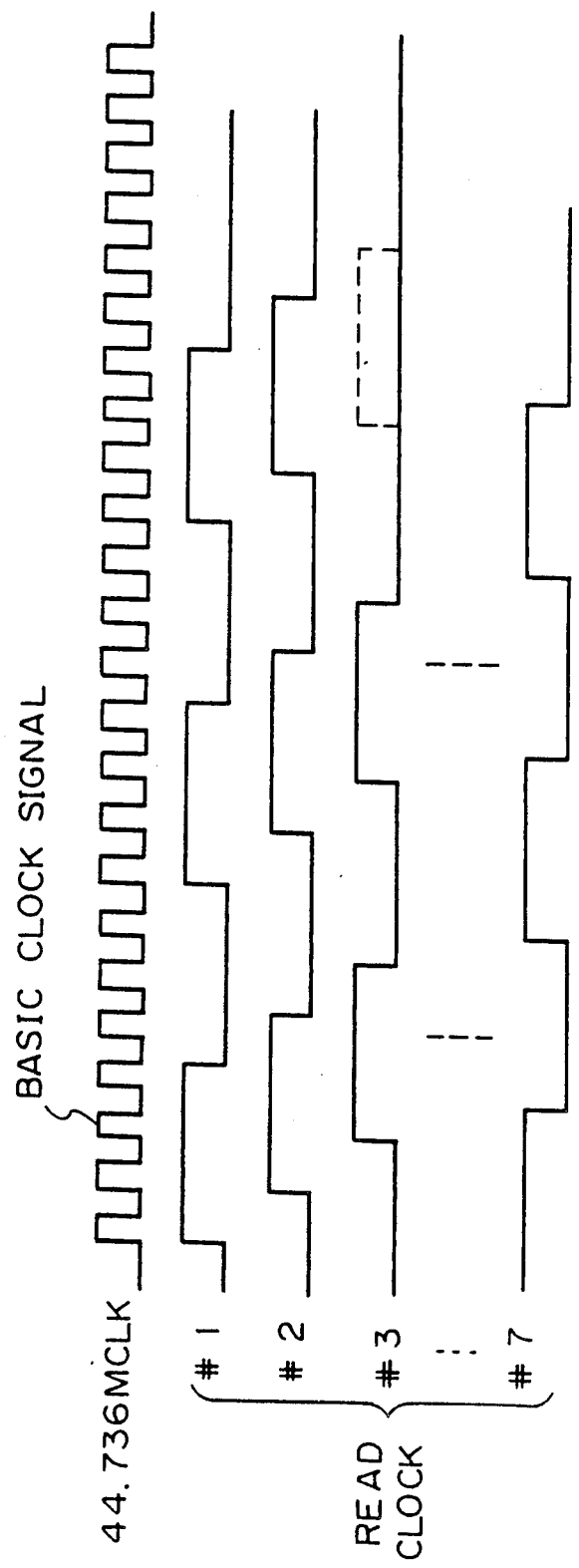
FIG. 2 is a timing chart of portions in the conventional apparatus shown in FIG. 1.

FIG. 2 is a timing chart of portions in the conventional apparatus shown in FIG. 1. That is, it shows the timing of the output of the shift clock signals output from the read clock generating unit 15 of the M23 unit 13. #1 to #7 are a first channel to seventh channel.

In the figure, "44.736 MCLK" means the basic clock signal of 44.736 MHz which is output from the clock source 16, while "read clocks #1 to #7" mean the shift clock signals which are supplied from the read clock generating unit 15 to the M12 multiplexer units 12.

The signals (first order group data signals and third order group data signals) input to and output from the M13 system 11 are freed of effects of jitter etc. and adjusted in signal speed by stuffing control and destuffing control. Therefore, the second read clock signals shown in FIG. 2 (same for write clock signals from unit 18) have to be prepared separately and supplied to the M12 multiplexer units 12. In the figure, in the channel #3, the block shown by the broken line shows the block removed by stuffing control.

Figure 3:
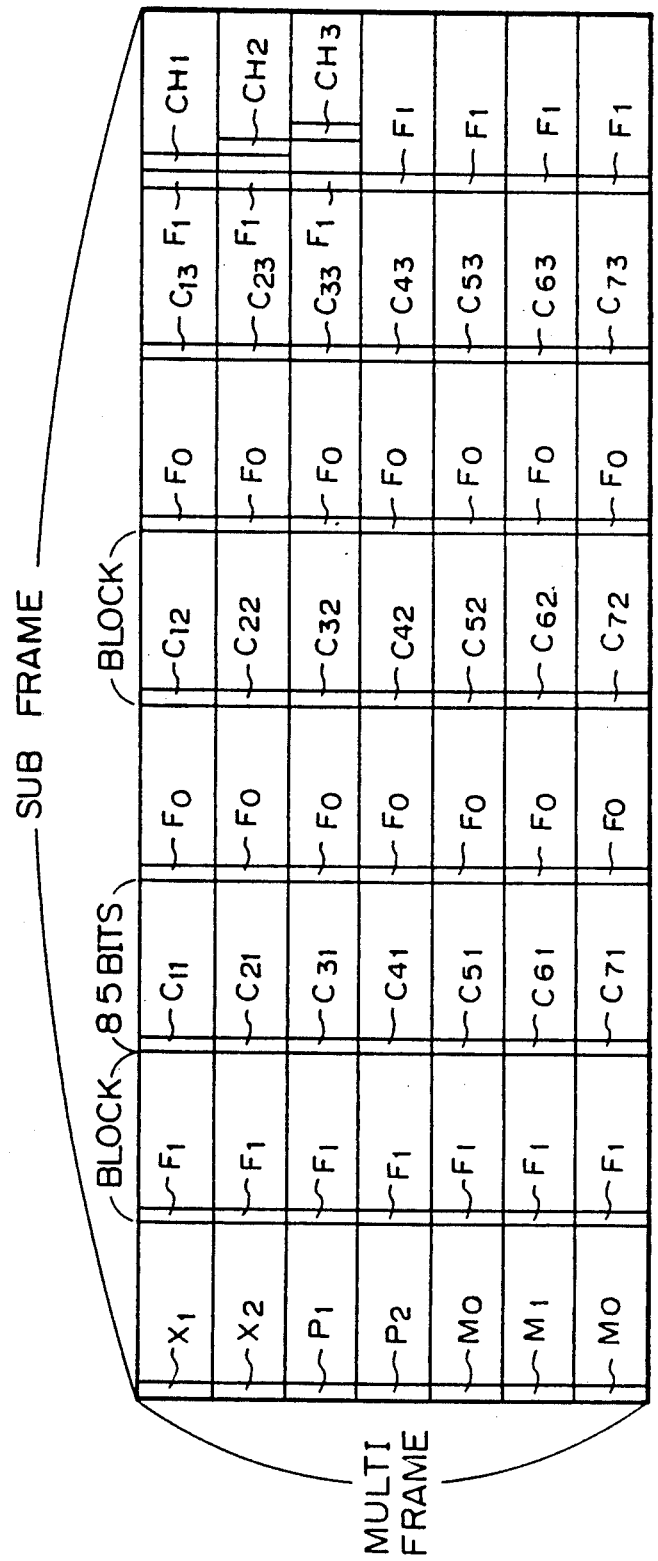
FIG. 3 is a view of the data format of third order group data signals.

FIG. 3 is a view of the data format of third order group data signals. The third order group data signal DS3 of FIG. 1 is, for example, constituted by the data format shown in FIG. 3. This data format shows the data signal of one multiframe. The same multiframe is repeated consecutively to form a series of data signals DS3.

One multiframe consists of seven consecutive subframes. In this case, the end of the front subframe and the head of the following subframe are connected to form the multiframe. Each subframe is constituted of eight blocks, each block including 85 bits. At the head of each block is inserted a so-called "G" bit. There are various types of "G" bits. X1, X2 is an office alarm bit, F1F0 are subframe frame synchronization bits, M0, M1 are multiframe frame synchronization bits, P1, P2 are parity bits, and Cmn is a stuffing indication bit. The m of Cmn shows the channel and the n shows the number of repetitions for the majority decision. Regarding the first channel, when there is a stuffing request, stuffing adjustment is performed by the CH1 bit. When there is no stuffing request, a data bit is entered. In the same way, a CH2 bit, CH3 bit, etc. are provided for the second channel, third channel, etc.

Figure 4:
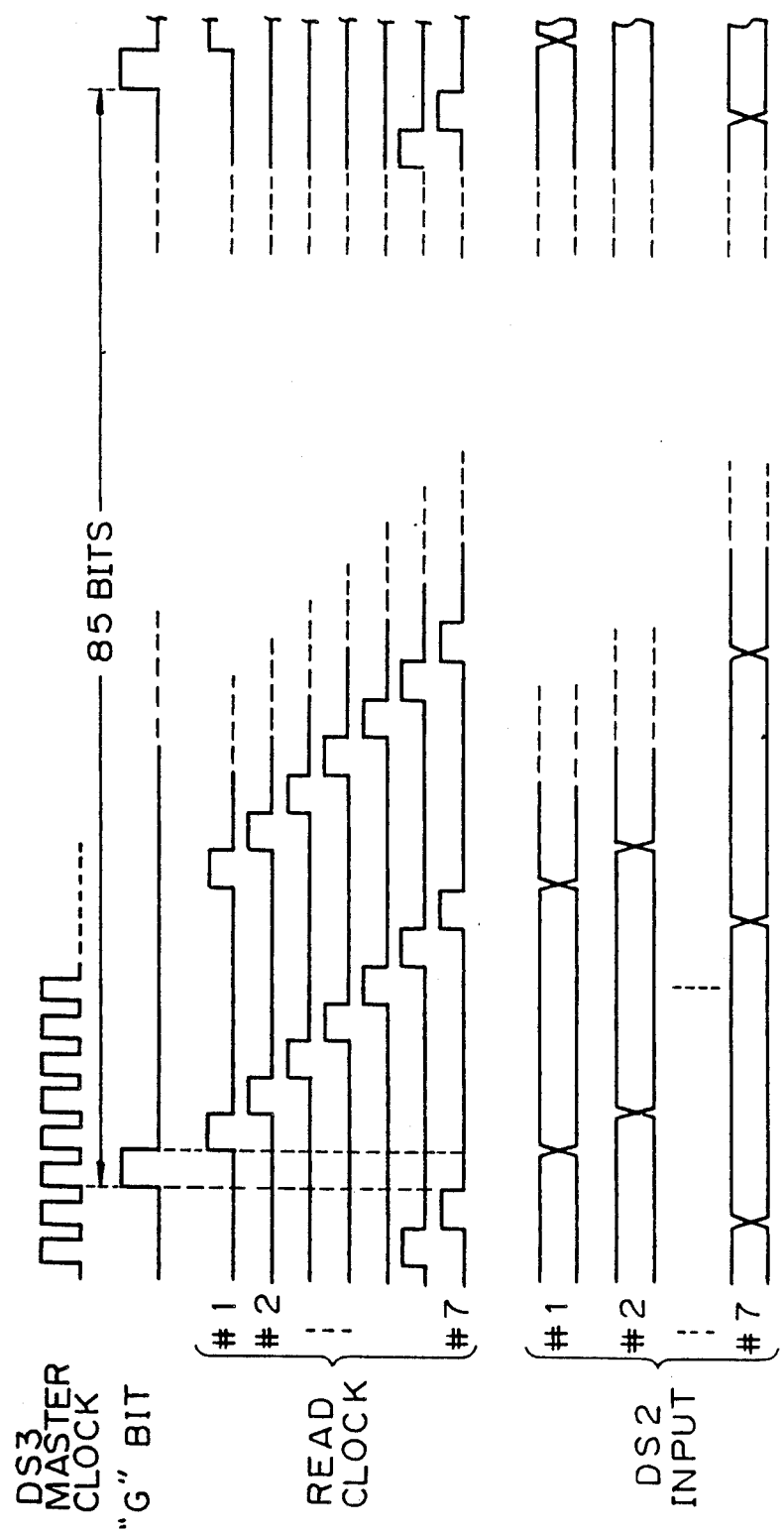
FIG. 4 is a timing chart showing in further detail of the timing chart of FIG. 2.

FIG. 4 is a timing chart showing in further detail the timing chart of FIG. 2. This shows the "G" bits explained in FIG. 3, the master clock of the signal DS3 (same as basic clock signal), and the third order group data signal DS3. The point which should be noted in FIG. 4 is that the shift clock signals (#1 to #7) from the read clock generating unit 15 are not completely consecutively shifted (same for write clock generating unit 18). This is because a "G" bit pulse is inserted between the shifts. As a result, timing clocks are generated corresponding to the channels and have to be supplied for each channel. That is, seven read clock signals are required for readout the second order group data signals from the M12 multiplexer units 12 corresponding to the channels. Further, seven write clock signals are required for supplying second order group data signals to the M12 demultiplexer unit 19. There is consequently much, complicated wiring. This is the problem mentioned earlier.

As mentioned earlier too, if one wishes to make the constituent portions of the M13 system 11 by LSI units, then it is necessary to reduce the number of connection pins for the clock supply lines (the number of input/output pins must be reduced since there are restrictions on the size of the LSI package). Therefore, the present invention proposes a system for performing the input and output of signals in synchronization with a common clock signal.

Figure 5:
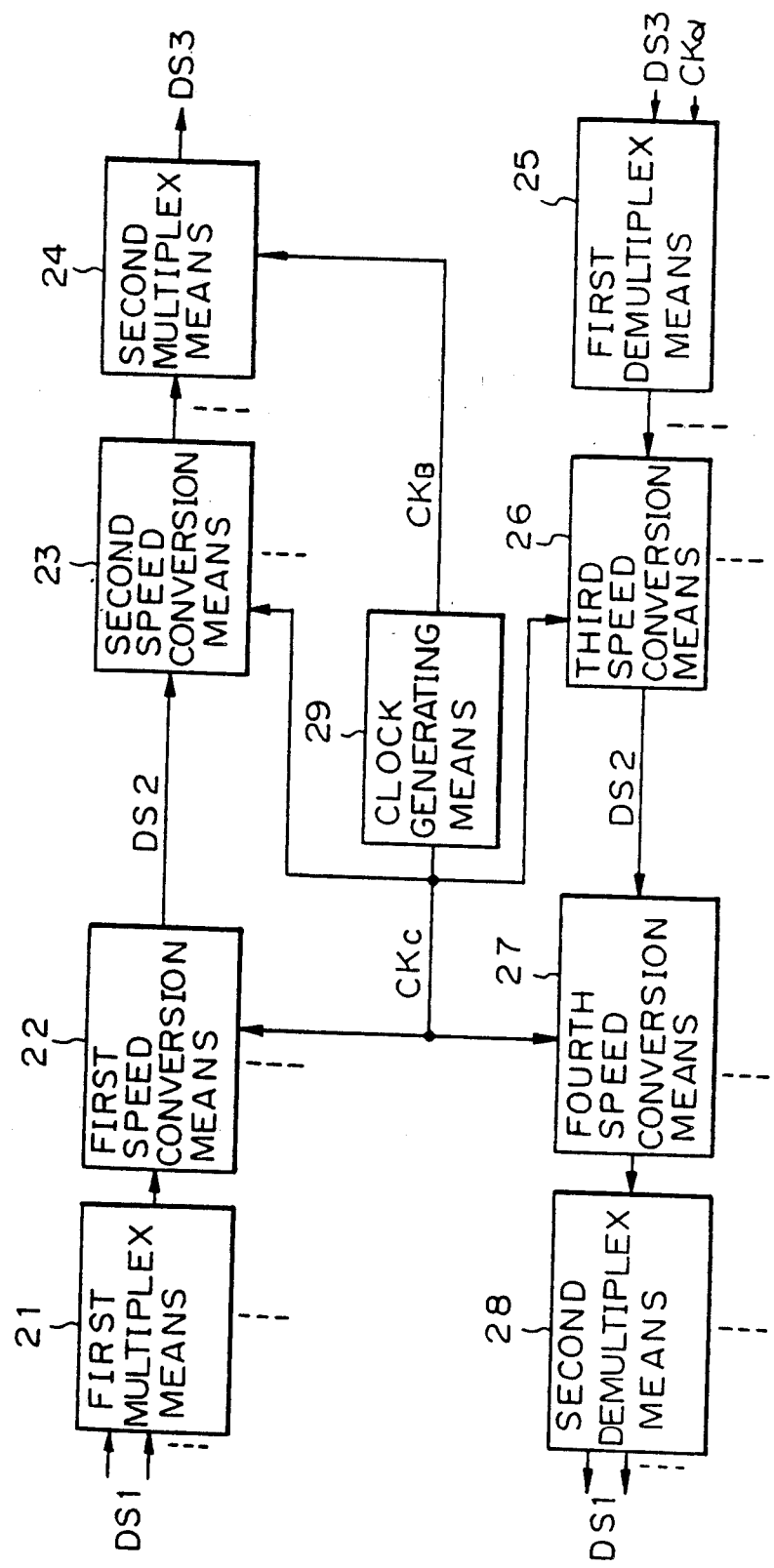
FIG. 5 is a block diagram of the principle of the complex multiplexer/demultiplexer apparatus relating to the present invention.

FIG. 5 is a block diagram of the principle of the complex multiplexer/demultiplexer apparatus relating to the present invention.

The present invention provides complex multiplexer/demultiplexer apparatus which includes:

a plurality of first multiplex means 21 which multiplex input first order group data signals DS1 to convert them into middle order group (second order group) data signals DS2, a second multiplex means 24 which multiplexes the middle order group (second order group) data signals DS2 to convert them into high order group (third order group) data signals DS3, a first demultiplex means 25 which demultiplexes the input high order group (third order group) data signals DS3 to convert them into middle order group (second order group) data signals DS2, a plurality of second demultiplex means 28 which demultiplex the middle order group (second order group) data signals DS2 to convert them into low order group (first order group) data signals DS1, and a clock generating means 29 which supplies the timing clocks required by the above means, wherein the second multiplex means 24 operates in synchronization with the basic clock signal $CK_B$ prepared by the clock generating means 29, the first multiplex means 21 operates in synchronization with a second order group data clock which is formed by applying speed conversion to a second order group common clock $CK_C$ formed by frequency dividing the basic clock signal $CK_B$, the second order group data clock completely bit synchronized with the middle order group common clock $CK_C$, but the second order group data clock including empty bits which are produced at a fixed cycle and the clock rate of the second order group data clock being lower than the clock rate of the second order group common clock, the first demultiplex means 25 operates in synchronization with a clock $CK_a$ given from a remote office (or external line), the second demultiplex means 28 operates in synchronization with the second order group data clock formed by applying speed conversion to a clock formed by frequency dividing the basic clock signal extracted from the input second order group data signal, the second order group data clock completely bit synchronized with the second order group common clock $CK_C$, formed by frequency dividing the basic clock signal, but the second order group data clock including empty bits which are produced at a fixed cycle and the clock rate of the second order group data clock being lower than the clock rate of the second order group common clock $CK_C$.

Preferably, additional information bits are inserted in each empty bit, the additional information bits being at least stuffing indication bits.

In each of the plurality of first multiplex means 21, the signals are multiplexed and the plurality of multiplexed signals output from there are further multiplexed by the second multiplex means 24.

Further, in the first demultiplex means 25, the signals are demultiplexed. Each of the demultiplexed signals, which are equal in number to the number of channels, are then further demultiplexed at the plurality of second demultiplex means 28.

In the transfer of signals between the first multiplex means 21 and the second multiplex means 24 and the transfer of signals between the first demultiplex means 25 and the second demultiplex means 28, the signal speed is converted by insertion of the additional information bits at the signal supply side and the signal speed is converted by deletion of the additional information bits by the signal receiving side.

In the present invention, by performing the input and output of signals by the insertion and deletion of the additional information bits in synchronization with the common frequency division clock signal $CL_C$, it is no longer necessary to perform stuffing and destuffing operations by supplying separate synchronization clock signals to each of the plurality of first multiplex means 21 and to each of the plurality of the second demultiplex means 28 as in the prior art.

Figure 6A:
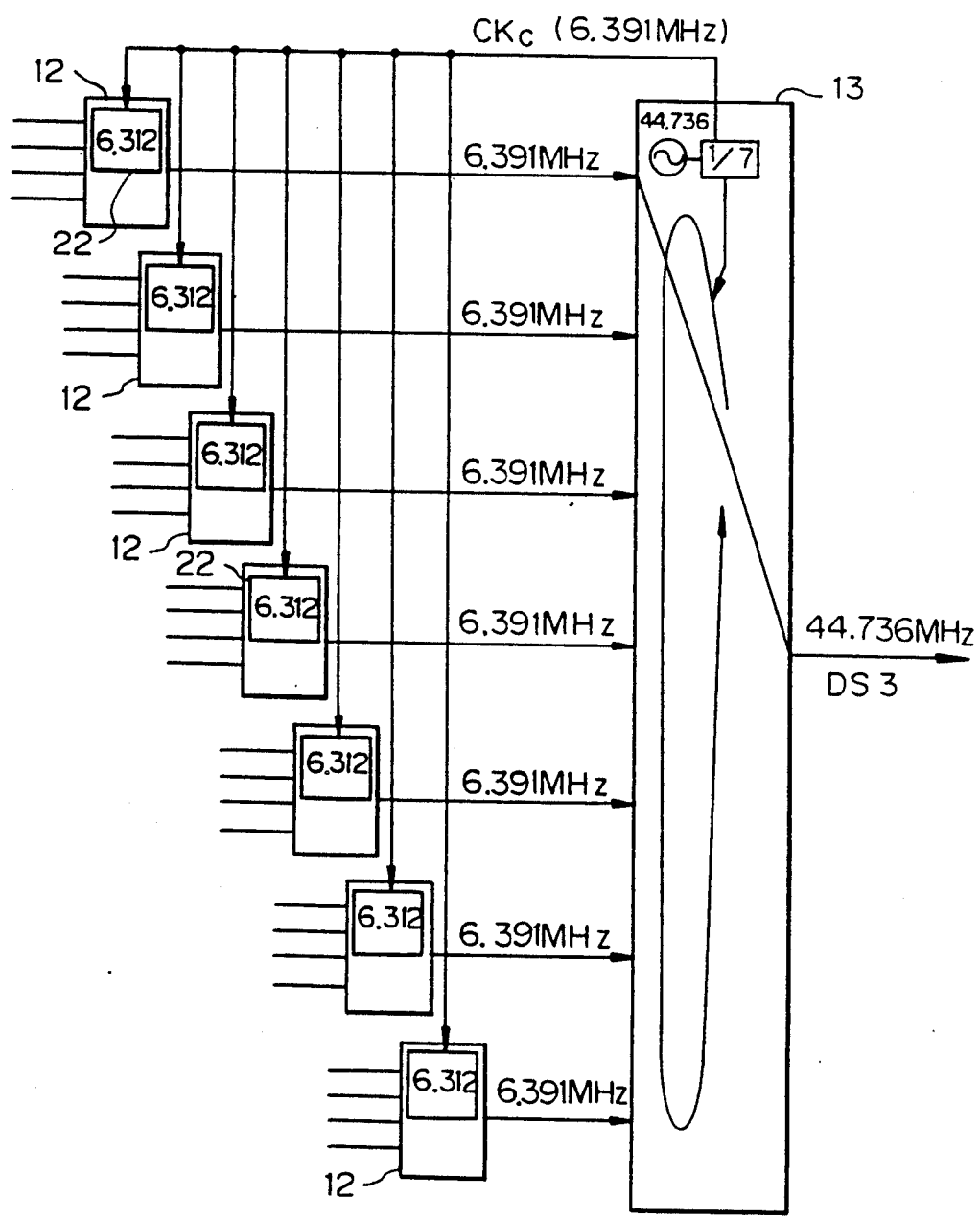
FIG. 6A is a view showing illustratively the basic concept of the present invention.
Figure 6B:
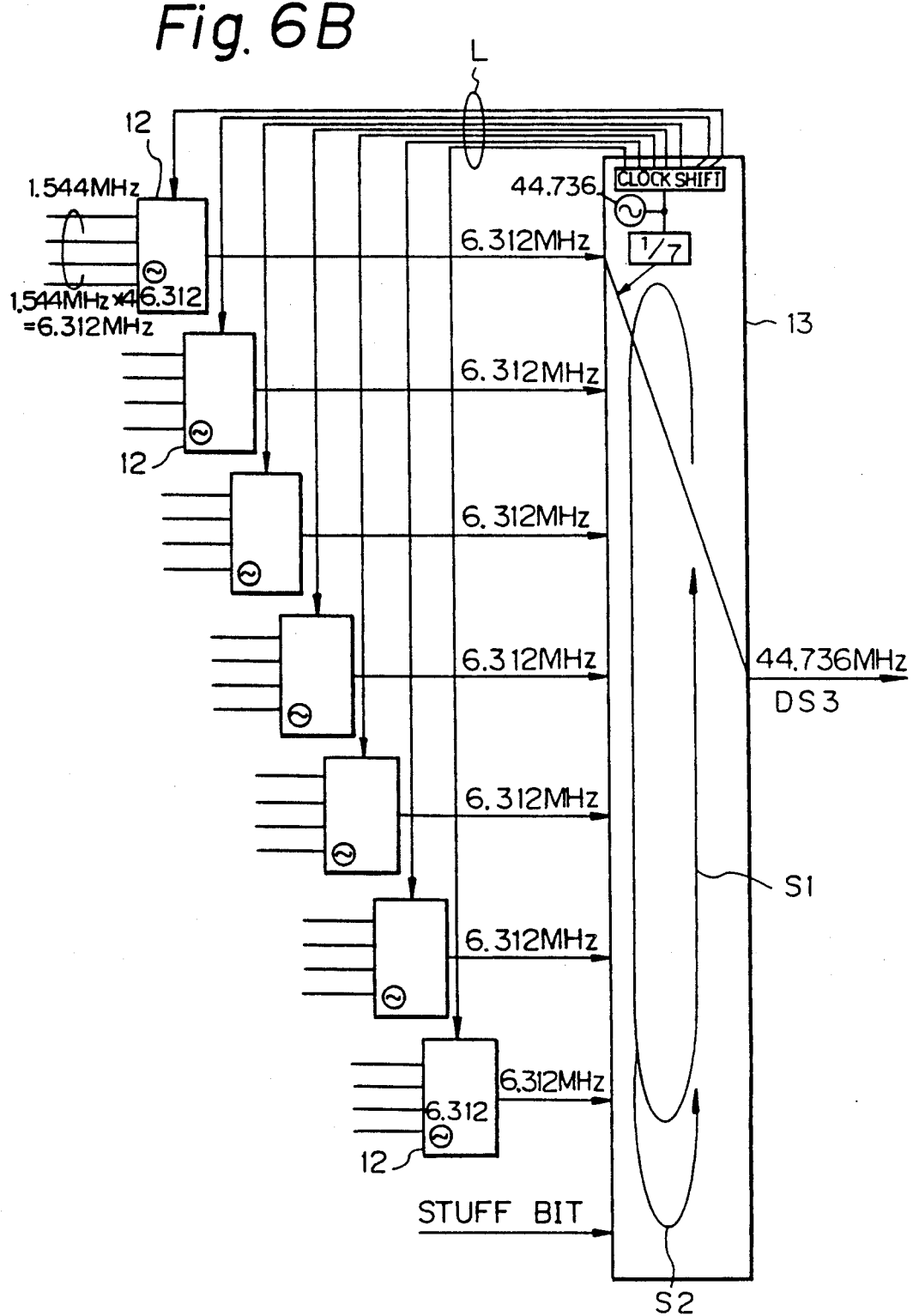
FIG. 6B is a view showing illustratively the basic concept of the prior art.

FIG. 6A is a view showing illustratively the basic concept of the present invention. FIG. 6B is a view showing illustratively the basic concept of the prior art. In FIG. 6A, reference numerals 12 and 13 correspond to the afore-mentioned M12 multiplexer unit and M23 unit (same in FIG. 6B). In FIG. 6A, the M12 multiplexer units 12 of the seven channels receive in common the second order group common clock $CK_C$ (6.391 MHz) from the M23 unit. This is converted once to a second order group data clock (6.312 MHz) by the speed conversion means 22, then raised to 6.391 MHz by the insertion of the above-mentioned empty bits and sent to the unit 13. The figure of 6.312 MHz is 1.544 MHz $\times 4$, as shown in FIG. 6B.

As opposed to this, in FIG. 6B, the channels data to the unit 13 at a 6.312 MHz clock. The unit 13 periodically generates a sampling S2 in which stuffing bits are inserted. Therefore, in FIG. 6B, a clock transfer line L is required for each channel. However, in FIG. 6A (present invention), the clocks of the channels are standardized to 6.391 MHz and it is made possible to receive a single clock $CK_C$ (6.391 MHz) from the unit 13. In the speed conversion means 22, however, it is necessary to match the second order group data clock (6.312 MHz) and the second order group common clock (6.391 MHz). That is, the speed 6.312 MHz of the second order group data clock is the apparent average speed. Between that bit train and the bit train of the second order group common clock, complete bit synchronization is obtained. Therefore, the afore-mentioned empty bits are inserted so as to reduce the 6.391 MHz clock (second order group common clock) to a 6.312 MHz clock (second order group data clock).

Figure 7:
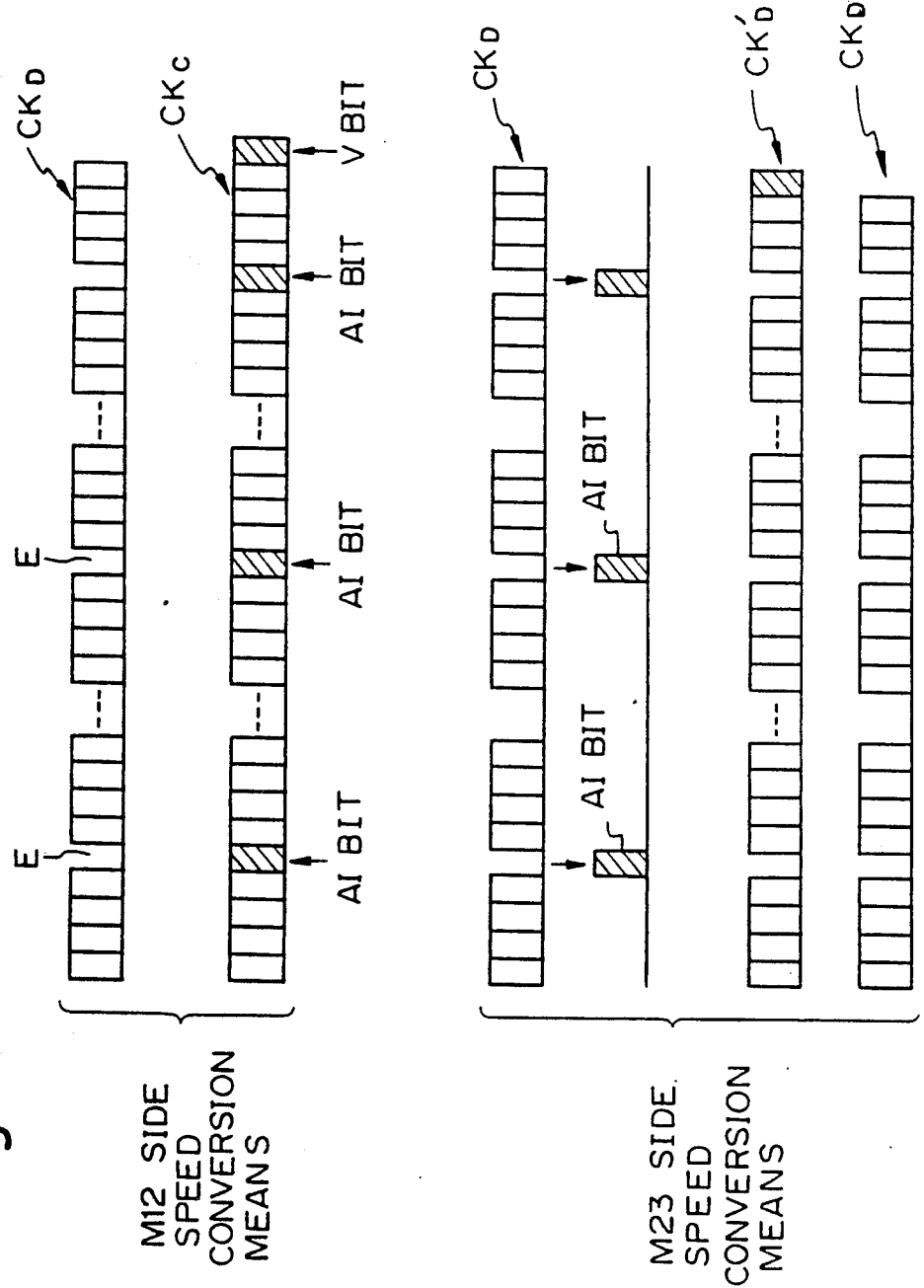
FIG. 7 is a view showing illustratively the speed conversion based on the present invention.

FIG. 7 is a view showing illustratively the speed conversion based on the present invention. The second order group data clock $CK_D$ is bit synchronized with the second order group common clock $CK_C$, but due to the empty bit E inserted periodically into the $CK_D$, the apparent speed falls to 6.312 MHz. Preferably, the additional information bit AI is inserted into the empty bit E. This additional information bit includes, when necessary, a variable slot bit (V bit) for elimination of jitter.

On the data reception side, the AI bit is extracted and the additional information (for example, the stuffing control information) is obtained. The $CK_D'$ in the lower section of FIG. 7 shows the bit train in the case of absorption of jitter, while the $CK_D$ under that shows the bit train in the case of the jitter not being absorbed.

Figure 8:
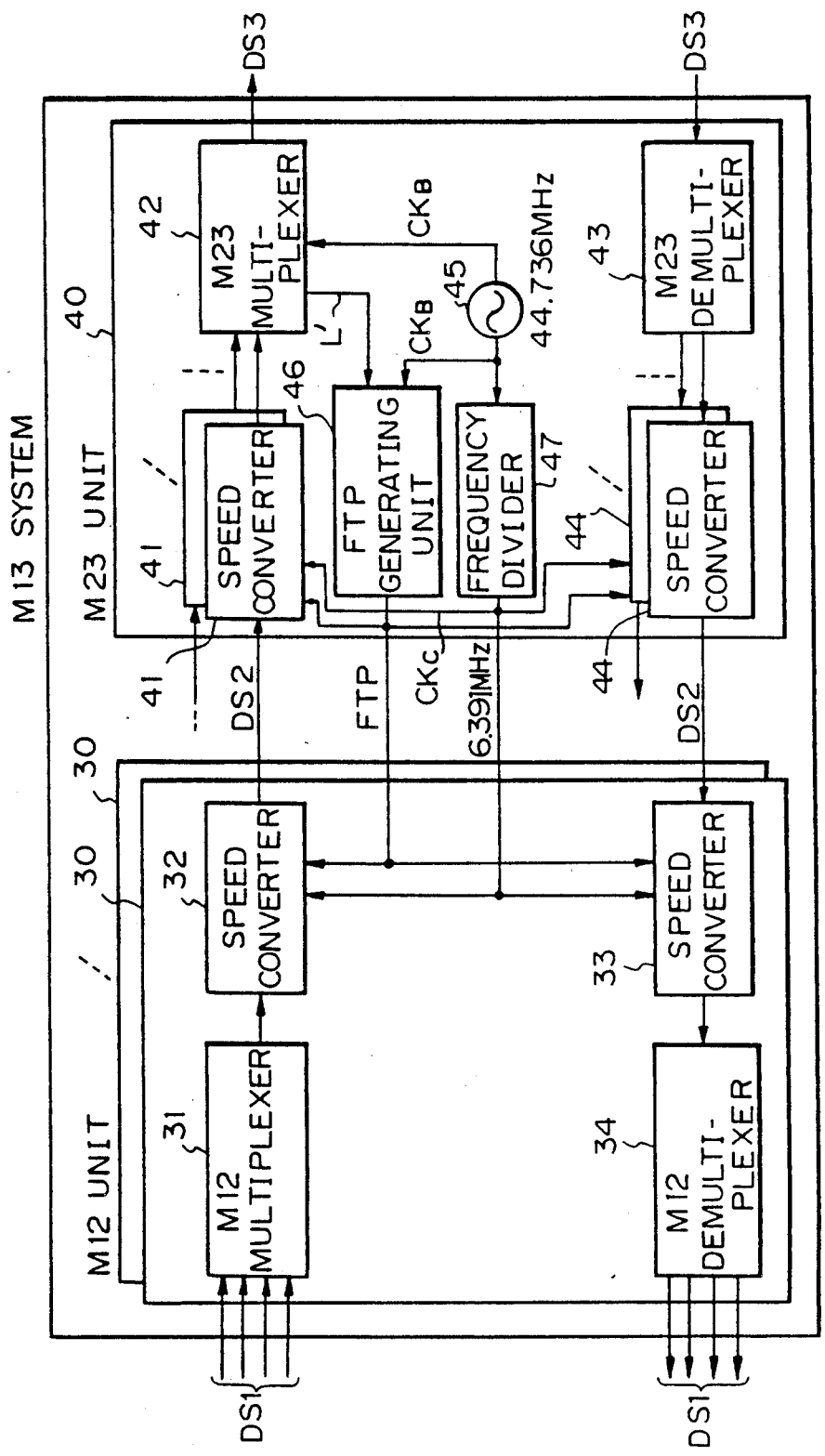
FIG. 8 is a block diagram showing an embodiment of the present invention.

FIG. 8 is a block diagram showing an embodiment of the present invention.

The first multiplex means 21 corresponds to the M12 multiplexer unit 31.

The first speed conversion means 22 corresponds to the speed converter 32.

The second speed conversion means 23 corresponds to the speed converter 41.

The second multiplex means 24 corresponds to the M23 multiplexer unit 42.

The first demultiplex means 25 corresponds to the M23 demultiplexer unit 43.

The third speed conversion means 26 corresponds to the speed converter 44.

The fourth speed conversion means 27 corresponds to the speed converter 33.

The second demultiplex means 28 corresponds to the M12 demultiplexer unit 34.

The clock generating means 29 corresponds to the clock source 45, the frame timing pulse generating unit 46, and the frequency divider 47.

The basic clock signal $CK_B$ corresponds to the clock signal of 44.736 MHz output from the clock source 45.

The second order group common clock $CK_C$ corresponds to the 6.391 MHz clock signal output from the frequency divider 47.

Based on the above correspondence, an explanation will be made of examples of the present invention.

(i) Overall Constitution of M13 System

In FIG. 8, the M13 system is provided with seven M12 units 31 which multiplex four first order group data signals DS1 to output second order group data signals DS2 and demultiplex second order group data signals DS2 to give four first order group data signals DS1 and an M23 unit 40 which multiplexes a total of seven second order group data signals DS2 supplied from the M12 units 30 to give third order group data signals DS3 and demultiplexes third order group data signals DS3 to obtain seven second order group data signals DS2 and supply the second order group data signals DS2 to the M12 units 30.

(ii) Constitution and Operation of M12 Units 30

The M12 units 30 are each provided with an M12 multiplexer unit 31 which multiplexes four first order group data signals DS1, an M12 demultiplexer unit 34 which demultiplexes signals to obtain four first order group data signals DS1, a speed converter 32 which performs speed conversion on signals by insertion of additional information bits (AI), and a speed converter 33 which performs speed conversion on signals by separation (deletion) of the additional information bits.

The speed converter 32 is supplied with a 6.391 MHz order group common clock $CK_C$ and frame timing pulse FTP (FIG. 11) supplied from the M23 unit 40. The speed converter 32 outputs a signal DS2 converted in speed to 6.391 Mbps by insertion of additional information bits into the second order group signals DS2 output from the M12 multiplexer unit 31 based on the clock signals and frame timing pulses.

A stuffing controlled signal is output from the M12 multiplexer unit 31. Speed conversion is performed by addition of specific bit information (stuffing indicator bit variable slot) at a predetermined bit position of this signal. The detailed operation will be explained later.

Further, the speed converter 33 is supplied with the above-mentioned 6.391 MHz common clock $CK_C$. The speed converter 33 separates the additional information bits from the signal supplied from the M23 unit 40 in synchronization with the clock $CK_C$ and further performs destuffing control to obtain a second group data signal and supplies the same to the M12 demultiplexer unit 34.

(iii) Constitution and Operation of M23 Unit 40

The M23 unit 40 is provided with an M23 multiplexer unit 42 which multiplexes seven second order group data signals DS2, an M23 demultiplexer unit 43 which demultiplexes signals to obtain seven second order group data signals DS2, seven speed converters 41 which perform speed conversion on signals by separation of the additional information bits (AI), seven speed converters 44 which perform speed conversion on signals by insertion of additional information bits, a clock source 45 which generates a 44.736 MHz basic clock signal $CK_B$, a frequency divider 47 which divides into seven the basic clock signal output from the clock source 45 to generate a 6.391 MHz second order group common clock $CK_C$, and an FTP generating unit 46 which generates a frame timing pulse (FTP) for obtaining frame synchronization.

The speed converters 41 correspond to the seven M12 unit 30. The 6.391 Mbps signals DS2 output from the speed converters 32 are input.

The speed converters 41 delete the additional information bits from the 6.391 Mbps signals DS2 and supply the 6.312 MHz second order group data signals DS2 obtained by destuffing control to the M23 multiplexer unit 42.

The speed converters 44 correspond to the seven second order group data signals DS2 separated by the M23 demultiplexer unit 43 and output the signals DS2 converted in speed to 6.391 Mbps by insertion of additional information bits to the 6.312 Mbps second order group data signals input from the M23 demultiplexer unit 43. The signals DS2 output from the speed converters 44 are supplied to the speed converters 33 of the M12 units 30.

Further, the clock source 45 generates a 44.736 MHz clock signal to serve as the basic clock signal $CK_B$ and supplies the same to the M23 multiplexer unit 42, the FTP generating unit 46, and the frequency divider 47. The M23 multiplexer unit 42 operates in synchronization with the clock signal $CK_B$. Further, the FTP generating unit prepares FTP's synchronized with the clock signal in accordance with the multiplexing operation (line L') in the M23 multiplexer unit 42 and supplies the same to the speed converters 32 of the M12 units 30. The frequency divider 47 divides the supplied 44.736 MHz basic clock signal $CK_B$ into seven to generate 6.391 MHz second order group common clocks $CK_C$ and supplies the same to the speed converters 32 and speed converters 33 of the M12 units 30.

Next, an explanation will be made of the detailed multiplexing and demultiplexing operations in the M13 system, case by case, taking note of the speed conversion operations by the speed converters.

Figure 9A:
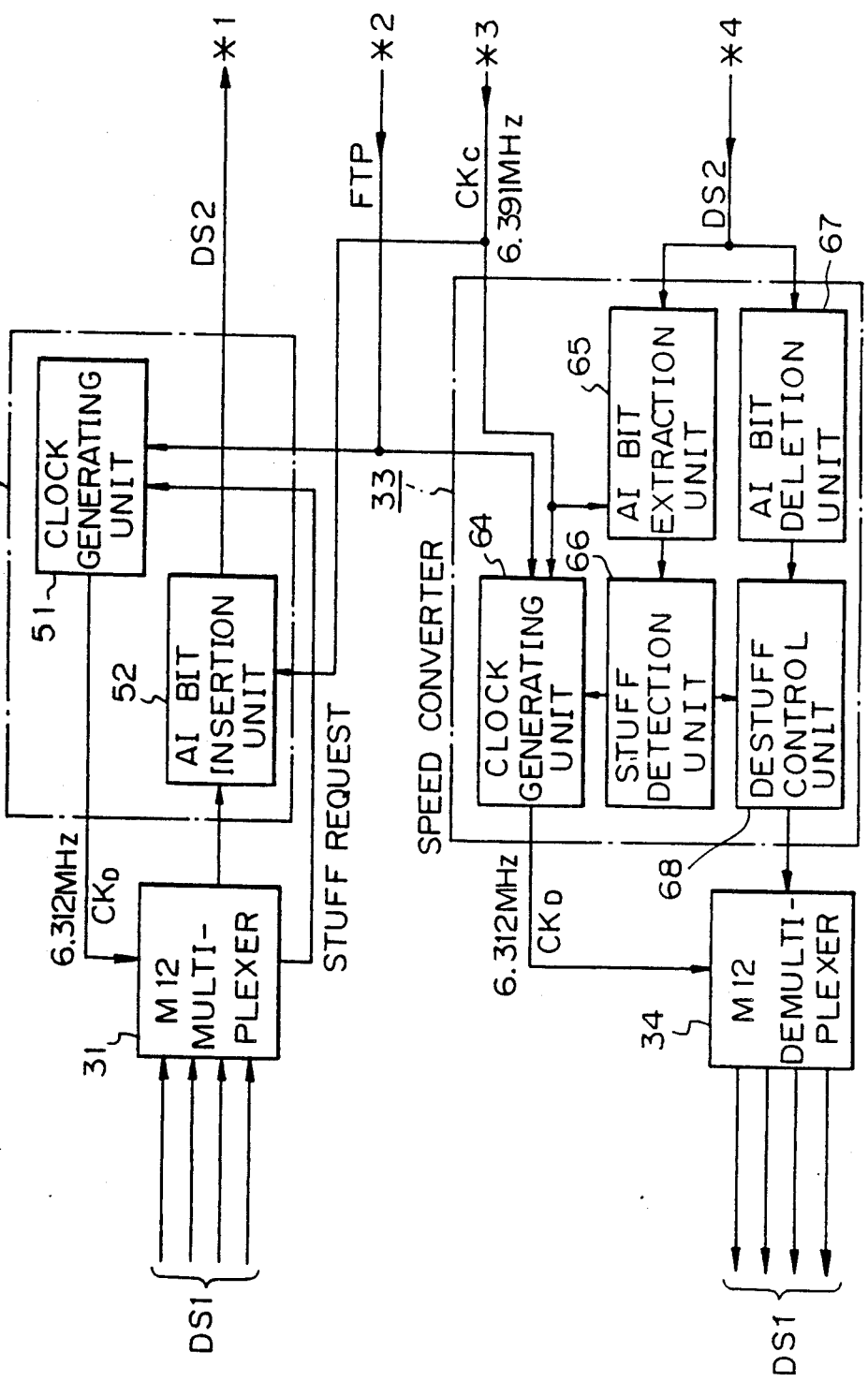
FIG. 9A and FIG. 9B are views of the specific circuit construction of speed converters.
Figure 9B:
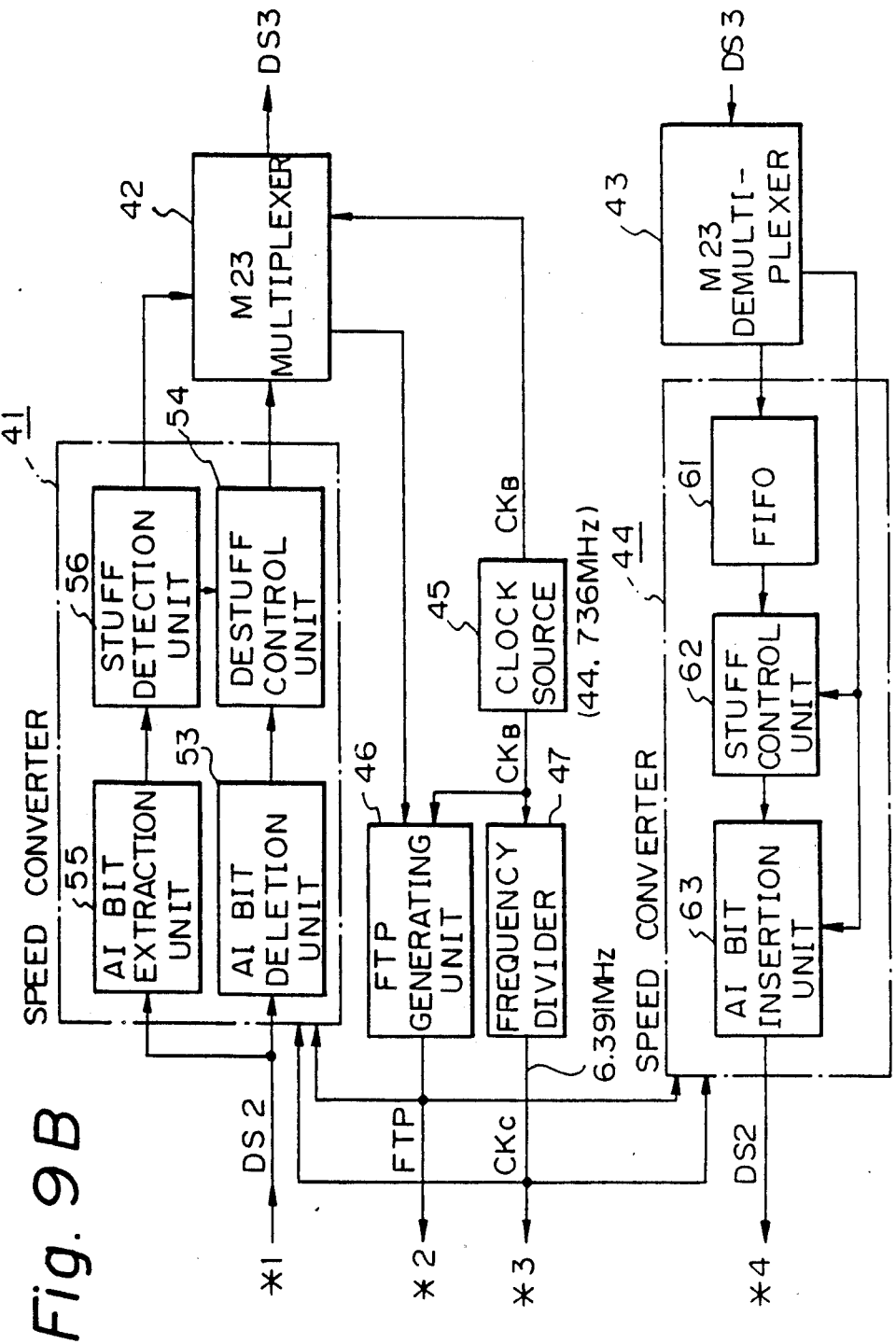

FIG. 9A and FIG. 9B are views of the specific circuit construction of speed converters. Note that these show the pair of M12 units 30, speed converter 32, and speed converter 33.

(iv) Operation During Multiplexing

In FIGS. 9A and 9B, the speed converter 32 is comprised of a clock generating unit 51 which generates a clock signal including empty bits, that is, the second order group data clock $CK_D$, in accordance with a stuffing request supplied from the M12 multiplexer unit 31 and an AI bit insertion unit 52 which inserts the additional information bits AI.

The clock generating unit 51 receives as input the stuffing request and the 6.391 MHz clock signal, that is, the second order group common clock $CK_C$, and supplies a 6.312 MHz clock signal $CK_D$ with empty bits to the M12 multiplexer unit 31.

The AI bit insertion unit 52 receives as input the 6.312 Mbps ($CK_D$) second order group data signal output from the M12 multiplexer unit 31 and inserts additional information bits AI to prepare a 6.391 Mbps ($CK_C$) signal.

An explanation will be made of the additional information bits inserted in the AI bit insertion unit 52.

Figure 10:
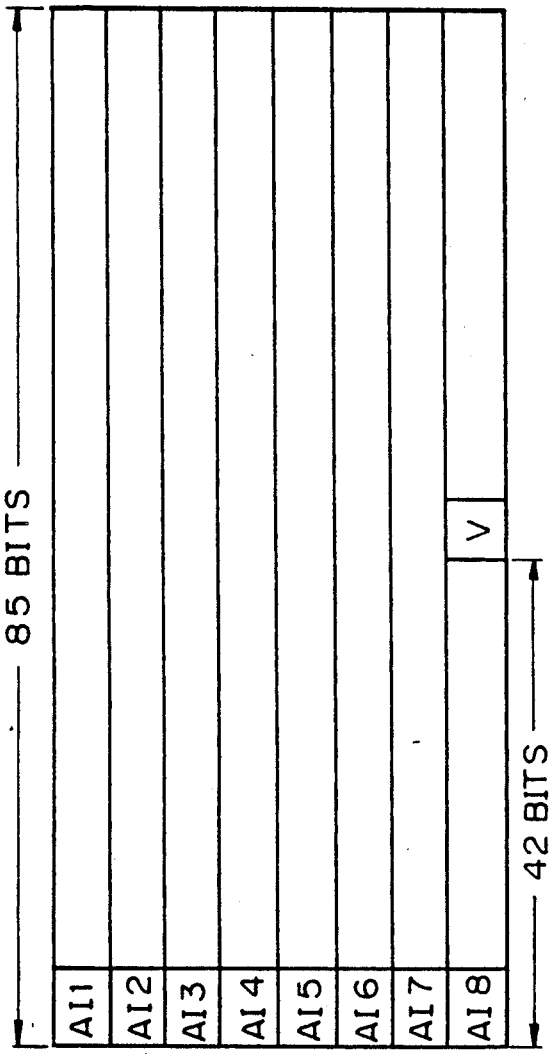
FIG. 10 is a view of an example of the data format of a frame including additional information bits.

FIG. 10 is a view of an example of the data format of a frame including additional information bits. The bit trains ($AI_1 \ldots, AI_2 \ldots$) are shown stacked vertically. In the figure, "$AI_1$" to "$AI_8$" show stuffing indicator bits, while "V" shows variable slot bits. Stuffing indicator bits (hereinafter referred to as AI bits) are inserted at a rate of one bit per 85 bits (see 85 bits of FIG. 3). After the eighth AI bit ($AI_8$) is inserted, a variable slot bit V is inserted at the 42nd bit. Note that 42 bits are shown as an example. The example shows insertion at about the middle (85/2) of 85 bits.

The insertion of the AI bits enables common use of the data format of the signal output from the speed converters 32 and the signal speeds.

Further, the variable slot bits V are used for eliminating the effects of jitter, etc. When the data becomes long, these bits are omitted. The information on the variable slot bits is included in the AI bits. For example, when the AI bits are all "1", this indicates that valid data is included in the variable slot bit V. When they are all "0", it indicates that the variable slot bits V are omitted.

The speed converters 41 are comprised of AI bit extraction units 55 which extract additional information bits AI in the input signals, an AI bit deletion unit 53 which deletes the additional information bits, a stuffing detection unit 56 which detects stuffing, and a destuffing control unit 54 which performs destuffing control in accordance with the detected stuffing.

A 6.391 Mbps ($CK_C$) signal DS2 is input into the AI bit extraction unit 55, whereupon AI bits ($AI_1, AI_2, \ldots$) inserted at a rate of one bit per 85 bits are extracted. The AI bit deletion unit 53 sends the signals with the AI bits deleted to the destuffing control unit 54. The stuffing detection unit 56 detects stuffing in accordance with the extraction operation of the additional information bits AI in the AI bit extraction unit 55, while the destuffing control unit 54 performs the destuffing control in accordance with stuffing detection. The 6.312 Mbps (second order group data clock CKD second order group data signal DS2 prepared by the destuffing control is supplied to the multiplexer unit 42 where further multiplexing is performed.

(v) Operation During Demultiplexing

The speed converter 44 includes a first-in first-out unit (FIFO) 61 which temporarily stores the second order group data signals and an AI bit insertion unit 63 which inserts additional information bits AI.

The FIFO unit 61 temporarily stores the 6.312 Mbps (second order group data block CKD) second order group data signals output from the M23 demultiplexer unit 43, then supplies the same to the stuffing control unit 62.

The stuffing control unit 62 and the AI bit insertion unit 63 are supplied from the M23 demultiplexer unit 43 with information regarding the stuffing bit position. Based on this information, stuffing control is performed at the stuffing control unit 62, then the AI bits and variable slot bits V are inserted by the AI bit insertion unit 63. The 6.391 Mbps (second order group common clock $CK_C$) signal DS2 output from the AI bit insertion unit 63 is supplied to the speed converter 33.

Further, the speed converter 33 includes an AI bit extraction unit 65 which extracts the additional information bits AI in the input signals DS2, an AI bit deletion unit 67 which deletes the additional information bits, a stuffing detection unit 66 which detects the stuffing, and a destuffing control unit 68 which performs destuffing control in accordance with the detected stuffing, and a clock generating unit 64 which generates a clock signal ($CK_D$) including empty bits in accordance with the detected stuffing.

The clock generating unit 64 is supplied with the results of the stuffing detection of the stuffing detection unit 66 and the 6.391 MHz second order group common clock $CK_C$ output from the frequency divider 47 and supplies a 6.312 MHz clock signal including empty bits to the M12 demultiplexer unit 34.

Further, the AI bit extraction unit 65, the stuffing detection unit 66, the AI bit deletion unit 67, and the destuffing control unit 68 act on the 6.391 Mbps ($CK_C$) signal DS2 output from the speed converter 44 to perform deletion of the additional information bits AI, detection of stuffing, and processing of destuffing, whereby the 6.312 Mbps $CK_D$ second order group data signal DS2 is supplied to the M12 demultiplexer unit 34.

Figure 11:
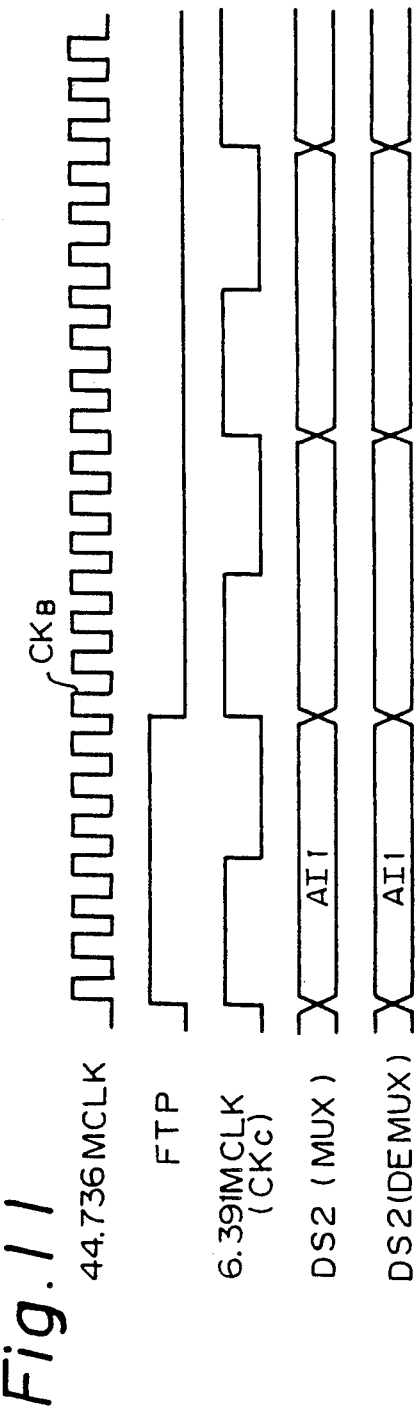
FIG. 11 is a timing chart of signals of key portions in FIG. 9A and FIG. 9B.

FIG. 11 is a timing chart of signals of key portions in FIG. 9A and FIG. 9B.

In the figure, "44.736 MCLK" means a 44.736 MHz basic clock signal $CK_B$ generated by the clock source 45, "FTP" means a frame timing pulse generated by the FTP generating unit 46, "6.391 MCLK" means a 6.391 MHz frequency divided clock signal (second order group common clock $CK_C$) generated by the frequency divider 47, "MUX" means a 6.391 Mbps signal DS2 supplied from the speed converters 32 of the M12 units 30 to the speed converters 41 of the M23 unit 40, and "DEMUX" means the 6.391 Mbps signal DS2 supplied from the speed converters 44 of the M23 unit 40 to the speed converters 33 of the M12 units 30.

The first AI bit ($AI_1$) is inserted in synchronization with the FTP output from the FTP generating unit 46, then the input and output of the 6.391 Mbps ($CK_C$) signal DS2 are performed in synchronization with the 6.391 MHz clock signal ($CK_C$) output from the frequency divider 47.

In this way, when a second order group data signal DS2 is supplied from the M12 unit 30 to the M23 unit 40 or from the M23 unit 40 to the M12 unit 30, additional information bits (AI bit and when necessary a variable slot bit V) are inserted at the output side and the additional information bits are deleted at the input side, whereby the format of the second order group data signals DS2 input and output can be standardized and an input and output operation synchronized with the common clock signal $CK_C$ (6.391 MHz) is possible.

Therefore, it becomes possible to streamline the clock supply lines (L in FIG. 6B), of which seven pairs (14) were previously necessary, and it becomes possible to streamline the wiring.

In particular, this streamlining of the clock supply lines can reduce the number of input and output pins at the time of conversion to an LSI and is effective in increasing the degree of freedom in LSI design.

Further, by standardizing the data format of the plurality of second order group data signals DS2 input and output between the M12 unit 30 and M23 unit 40 and by synchronizing the signals with the same clock signal (6.391M), it becomes possible to realize a drop/insert function at the second order group data signal level of the M13 system. The drop/insert function is a function for pulling in and inserting data at the time of relay of signals and is required in apparatuses having signal relay and termination functions.

Conventional M13 systems performed stuffing control based on separate clock signals during multiplexing and demultiplexing, so it was impossible to pull in and insert data at the second order data signal level.

Figure 12:
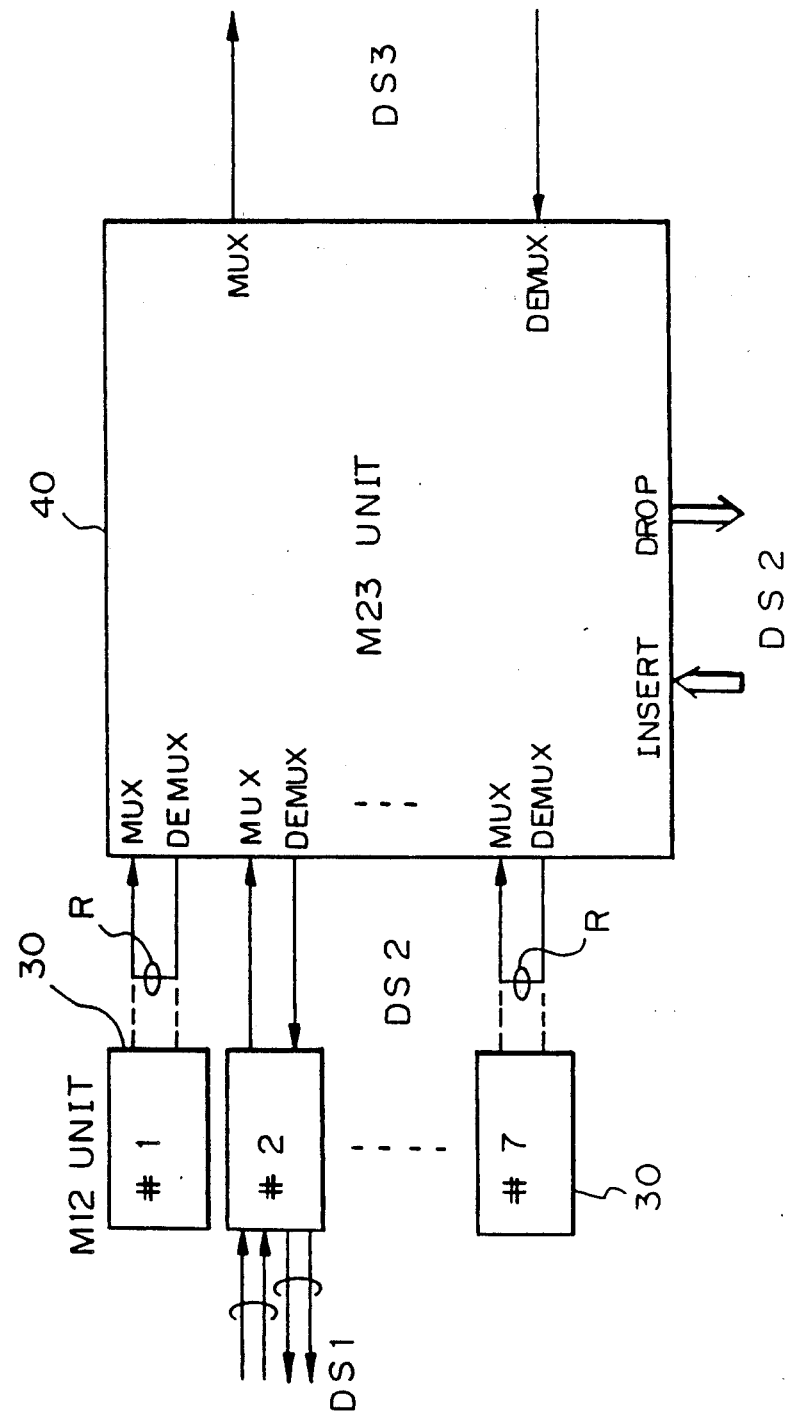
FIG. 12 is a view of explaining an example of the advantages given by the present invention.

FIG. 12 is a view for explaining an example of the advantages given by the present invention and shows specifically the drop/insert function. For example, in a public data network, data is transferred between a central office and remote offices. In this case, there is sometimes a repeater office inserted between the central office and remote offices. This repeater office is also called a "HUB" office. This "HUB" office has the functions of taking out (drops) data from data lines between the central office and remote offices, inserting data in these data lines, and returning data.

In the M13 system according to the present invention, the data format of the second order group signals is standardized and the same clock signal (6.391) is synchronized with, so it is possible to return the second order group data signal output from the M23 unit 40 and a drop/insert function can be easily realized. In FIG. 12, the return of the second order group data signal is shown by the symbol R.

Figure 13:
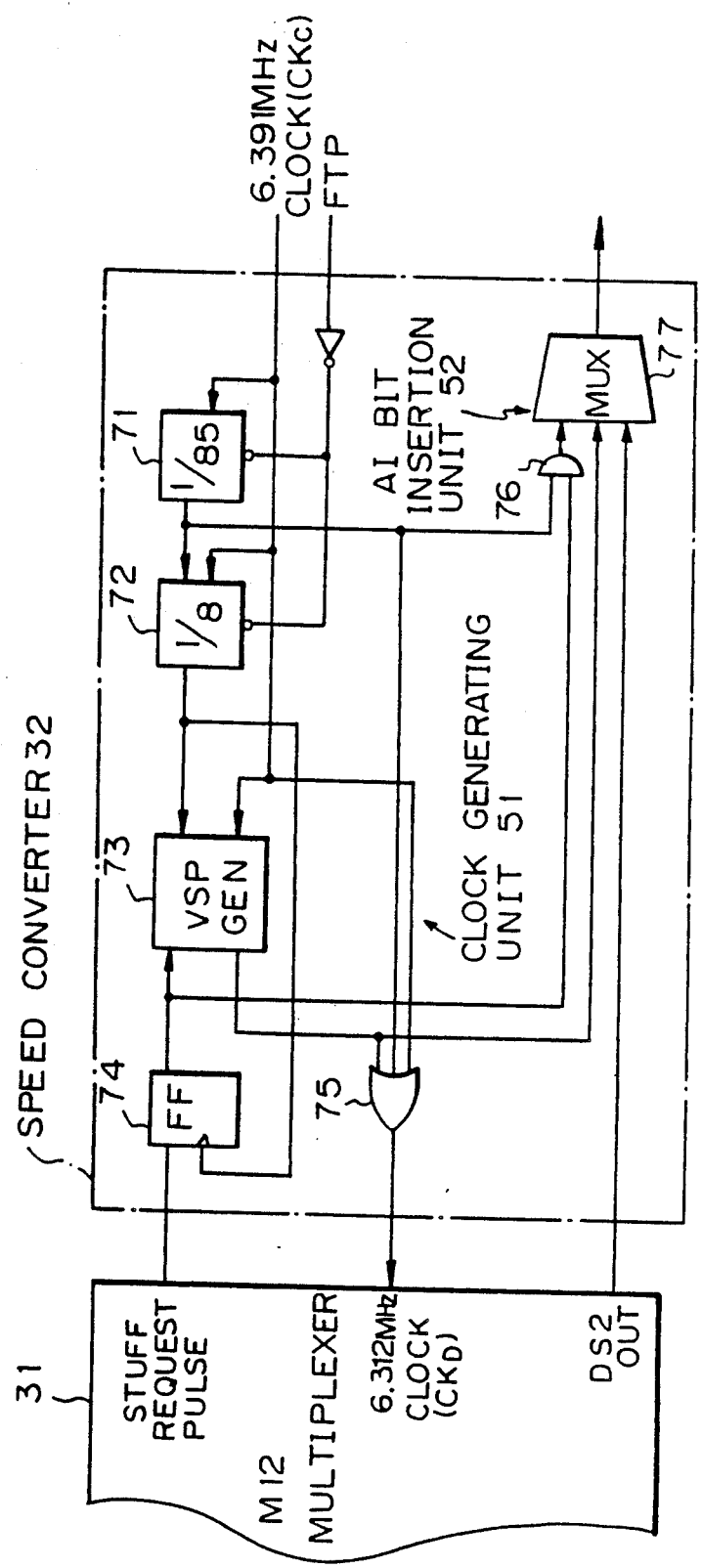
FIG. 13 is a circuit diagram of a detailed example of the speed converter 32.
Figure 14:
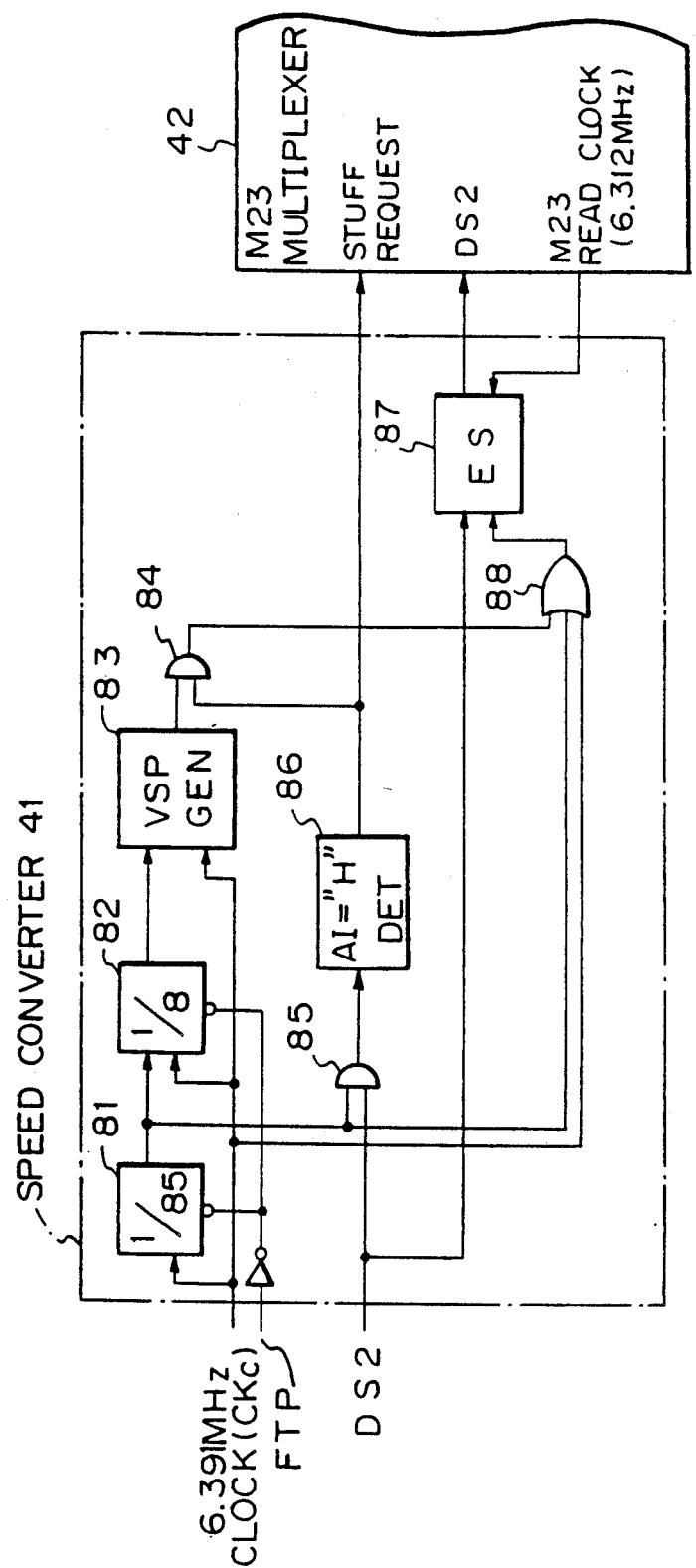
FIG. 14 is a circuit diagram showing a detailed example of the speed converter 41.
Figure 15:
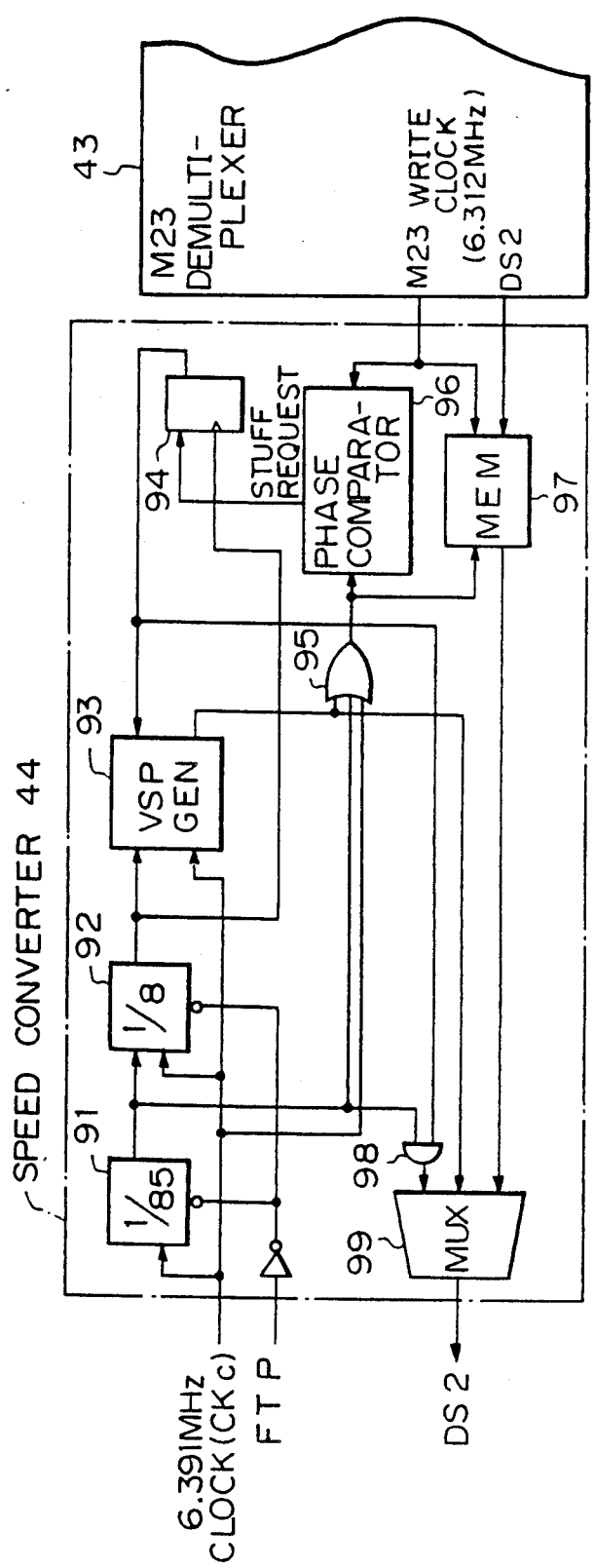
FIG. 15 is a circuit diagram showing a detailed example of the speed converter 44.
Figure 16:
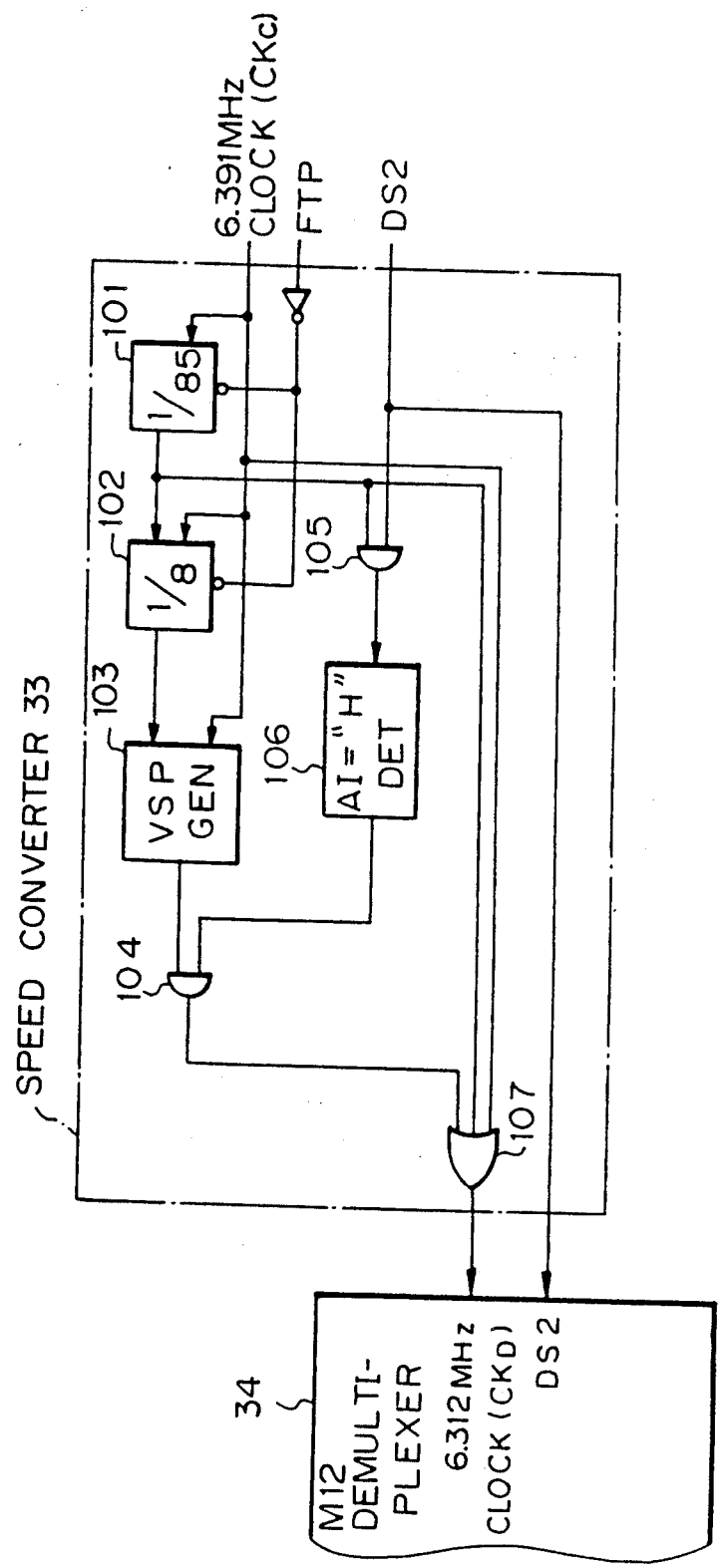
FIG. 16 is a circuit diagram showing a detailed example of the speed converter 33.

FIG. 13 is a circuit diagram of a detailed example of the speed converter 32, FIG. 14 is a circuit diagram showing a detailed example of the speed converter 41, FIG. 15 is a circuit diagram showing a detailed example of the speed converter 44, and FIG. 16 is a circuit diagram showing a detailed example of the speed converter 33.

In FIG. 13, the speed converter 32 includes a first frequency divider 71 and a second frequency divider 72 which respectively receive the second order group common clock $CK_C$ and frame timing pulse FTP and are connected in cascade, a flip flop 74 which receives the output of the second frequency divider 72 as a clock input and is set by the stuffing request pulse, a first variable slot pulse generator 73 which receives as input the output of the second frequency divider 72, the second order group common clock $CK_C$, and the output of the flip flop 74, and a first OR gate 75 which receives as input the output of the first variable slot pulse generator 73, the second order group common clock $CK_C$, and the frame timing pulse FTP, the second order data clock $CK_D$ being output from the first OR gate 75. The above construction forms the clock generating unit.

Further, it includes a first AND gate 76 which receives as input the output of the first frequency divider 71 and the output of the flip flop 74 and a multiplexer unit 77 which multiplexes the output of the first AND gate 76, the output of the variable slot pulse generator 73, and the second order group data signal DS2 from the corresponding multiplexer unit 31, the output of the multiplexer unit 77 being supplied to the corresponding speed converter 44.

In FIG. 14, the speed converter 41 includes a third frequency divider 81 and a fourth frequency divider 82 which respectively receive the second order group common clock $CK_C$ and frame timing pulse FTP and are connected in cascade, a second variable slot pulse generator 83 which receives as input the output of the fourth frequency divider 82 and the second order group common clock $CK_C$, a second AND gate 85 which receives as input the output of the third frequency divider 81 and the second order group data signal DS2 from the speed converter 32, an additional information bit detector 86 which receives the output of the second AND gate 85 and detects the additional information bits AI, a third AND gate 84 which receives as input the detection output from the additional information bit detector 86 and the output of the second variable slot pulse generator 83, a second OR gate 88 which receives as input the output of the third AND gate 84, the output of the third frequency divider 81, and the second order group common clock $CK_C$, and an elastic memory (ES) 87 which is subjected to read control by the output of the second OR gate 88 and the write clock synchronized with the middle order group data clock ($CK_D$) from the corresponding multiplexer unit 42 and which receives the second order group data signal DS2, the detection output from the additional information bit detector 86 being supplied as the stuffing request to the corresponding multiplexer unit 42 or being supplied as the middle order group data signal DS2 to multiplex the output of the elastic memory 87.

In FIG. 15, the speed converter 44 includes a first frequency divider 91 and a second frequency divider 92 which respectively receive the second order group common clock $CK_C$ and frame timing pulse FTP and are connected in cascade, a flip flop 94 which receives the output of the second frequency divider 92 as a clock input and is set by the generation of the stuffing request a first variable slot pulse generator 93 which receives as input the output of the second frequency divider 92, the second order group common clock $CK_C$, and the output of the flip flop 94, and a first OR gate 95 which receives as input the output of the first variable slot pulse generator 93, the second order group common clock $CK_C$, and the output of the first frequency divider 91, a phase comparator 96 which receives the output of the first OR gate 95 and the write clock synchronized with the second order group data clock $CK_D$ supplied from the demultiplexer unit 43, compares the phase of the two, based on the results of the comparison generates the stuffing request when the phase deviation is large, gives it to the flipflop 94 as a stuffing request pulse, and sets the same, a memory (MEM) 97 which stores second order group data signals DS2 supplied from the demultiplexer unit 43 by the write clock and is read out by the output of the first OR gate 95, a first AND gate 98 which receives as input the output of the flip flop 94 and the output of the first frequency divider 91, and a multiplexer unit 99 which multiplexes the output of the first AND gate 98, the output of the first variable slot pulse generator 93, and the second order group data signal DS2 read out from the memory 97, the output of the multiplexer unit 99 being supplied to the corresponding speed converter 33.

In FIG. 16, the speed converter 33 includes a third frequency divider 101 and a fourth frequency divider 102 which respectively receive the second order group common clock $CK_C$ and frame timing pulse FTP and are connected in cascade, a second variable slot pulse generator 103 which receives as input the output of the fourth frequency divider 102 and the second order group common clock $CK_C$, a second AND gate 105 which receives as input the output of the third frequency divider 101 and the second order group data signal DS2 from the speed converter 44, an additional information bit detector 106 which receives the output of the second AND gate 105 and detects the additional information bits AI, a third AND gate 104 which receives as input the detection output from the additional information bit detector 106 and the output of the second variable slot pulse generator 103, and a second OR gate 107 which receives as input the output of the third AND gate 104, the output of the third frequency divider 101, the output from the second OR gate 107 being used as the second order group data clock $CK_D$ and supplied together with the second order group data signal DS2 to the corresponding demultiplexer unit 34.

Note that in the above embodiments of the present invention, consideration was given to the North American M13 system (where the basic clock signal has a frequency of 44.736 MHz), but the same applies M13 system in Japan (where the basic clock signal has a frequency of 32.064 MHz).

Further, consideration was given to an M13 system performing multiplexing and demultiplexing between first order group signals and third order group signals, but the present invention may also be applied to multiplexing and demultiplexing between other signals.

Still further, regarding FIG. 5 and FIG. 8, an explanation was made of the correspondence between the present invention and an embodiment, but the present invention is not limited to the same. The fact that the present invention includes various modifications can be easily understood by persons skilled in the art.

As mentioned above, according to the present invention, by performing input and output of the signals DS2 while inserting and deleting additional information bits in synchronization with a common frequency divided clock signal, it is possible to realize multiplexing and demultiplexing operations synchronized with a common clock signal, which is extremely useful.

We claim:

1. A complex multiplexer/demultiplexer apparatus which comprises:
    a plurality of first multiplex means for multiplexing input low order group data signals to convert them into middle order group data signals,
    second multiplex means for multiplexing the middle order group data signals to convert them into high order group data signals,
    first demultiplex means for demultiplexing the input high order group data signals to convert them into middle order group data signals,
    a plurality of second demultiplex means for demultiplexing the middle order group data signals to convert them into low order group data signals,
    a plurality of first speed conversion means connected to said plurality of first multiplex means, for inserting empty bits in the middle order group data signals,
    a plurality of second speed conversion means, connected to the second multiplex means, for deleting the empty bits from the middle order group data signals, and
    clock generating means for supplying timing clocks required by the above means, the multiplexing in the plurality of first multiplex means being performed based on a common timing clock related to the timing clock used in the multiplexing in the second multiplex means.

2. An apparatus according to claim 1, wherein the second multiplex means operates in synchronization with a basic clock signal generated by the clock generating means, the first multiplex means operates in synchronization with a middle order group data clock which is formed by applying speed conversion to a middle order group common clock formed by frequency dividing the basic clock signal, the middle order group data clock being bit synchronized with the middle order group common clock, but the middle order group data clock including empty bits which are produced at a fixed cycle and the clock rate of the middle order group data signal being lower than the clock rate of the middle order group common clock.

3. An apparatus according to claim 1, wherein the middle order group data signals transfer control data in the empty bits between the first and second speed conversion means.

4. An apparatus according to claim 2, wherein additional information bits are inserted in the empty bits and the additional information bits include stuffing indication bits.

5. An apparatus according to claim 4, wherein the insertion of the additional information bits is performed by the first speed conversion means, and the second speed conversion means deletes the inserted additional information bits, converts the speed, extracts the additional information bits, and supplies the extracted additional information bits for control at the corresponding second multiplex means.

6. An apparatus according to claim 5, wherein the clock generating means includes a frame timing pulse generating unit, which frame timing pulse generating unit generates a frame timing pulse synchronized with the basic clock signal based on the multiplexing operation in the second multiplex means, generates empty bits in the first speed conversion means synchronized with the frame timing pulse, and inserts additional information bits in the empty bits.

7. An apparatus according to claim 6, wherein the first speed conversion means include a clock generating unit which receives as input the middle order group common clock and the frame timing pulse and outputs the middle order group data clock.

8. An apparatus according to claim 7, wherein the first speed conversion means includes an additional information bit insertion unit which inserts additional information bits into the empty bits in the middle order group data clock generated in the clock generating unit and which transmits the middle order group data signal synchronized with the middle order group common clock to the corresponding second speed conversion means.

9. An apparatus according to claim 8, which has, in the second speed conversion means, an additional information deletion unit which deletes additional information bits from the middle order group data signal received from the corresponding first speed conversion means, an additional information bit extraction unit which extracts additional information bits from the middle order group data signal, a stuffing detection unit which detects stuffing based on the extracted additional information bits, and a destuffing control unit which performs destuffing on the middle order group data signal passing through the additional information deletion unit based on the detected stuffing.

10. An apparatus according to claim 9, which is provided with a jitter removing variable slot at a part of a data bit train having at its head a stuffing indication bit, the variable slot being used as the control bit for the jitter removal when a stuffing request pulse is output from the corresponding first multiplex means and being used as the data bit forming part of the data bit train when the stuffing request pulse is output.

11. an apparatus according to claim 10, wherein the clock generating unit in the first speed conversion means comprises:
   a first frequency divider and a second frequency divider connected in cascade, the first frequency divider receives the middle order group common clock and frame timing pulse and the second frequency divider receives at least the frame timing pulse,
   a flip flop which receives the output of the second frequency divider as a clock input and is set by the stuffing request pulse,
   a first variable slot pulse generator which receives as input the output of the second frequency divider, the middle order group common clock, and the output of the flip flop, and
   a first OR gate which receives as input the output of the first variable slot pulse generator, the middle order group common clock, and the frame timing pulse, the middle order data clock being output from the first OR gate, and
wherein the additional information bit insertion unit in the first speed conversion means comprises:
   a first AND gate which receives as input the output of the first frequency divider and the output of the flip flop, and
   a multiplexer unit which multiplexes the output of the first AND gate, the output of the variable slot pulse generator, and the middle order group data signal from the corresponding first multiplexer unit, the output of the multiplexer unit being supplied to the corresponding speed conversion means.

12. an apparatus according to claim 11, wherein the second speed conversion means each is comprised of:
   a third frequency divider and a fourth frequency divider which respectively receive the second order group common clock and frame timing pulse and are connected in cascade,
   a second variable slot pulse generator which receives as input the output of the fourth frequency divider and the middle order group common clock,
   a second AND gate which receives as input the output of the third frequency divider and the middle order group data signal from the first speed conversion means,
   an additional information bit detector which receives the output of the second AND gate and detects the additional information bits,
   a third AND gate which receives as input the detection output from the additional information bit detector and the output of the second variable slot pulse generator,
   a second OR gate which receives as input the output of the third AND gate, the output of the third frequency divider, and the middle order group common clock, and
   an elastic memory which is subjected to read control by the output of the second OR gate and the write clock synchronized with the middle order group data clock from the corresponding second multiplexer unit and which receives the middle order group data signal,
   the detection output from the additional information bit detector being supplied as the stuffing request to the corresponding second multiplexer unit and being supplied as the middle order group data signal to multiplex the output of the elastic memory.

13. A complex multiplexer/demultiplexer apparatus which comprises:
   a plurality of first multiplex means for multiplexing input low order group data signals to convert them into middle order group data signals,
   second multiplex means for multiplexing the middle order group data signals to convert them into high order group data signals,
   first demultiplex means for demultiplexing the input high order group data signals to convert them into middle order group data signals,
   a plurality of second demultiplex means for demultiplexing the middle order group data signals to convert them into low order group data signals,
   a plurality of first speed conversion means connected to the plurality of first multiplex means to insert empty bits in the middle order group data signals,
   a plurality of second speed conversion means connected to the second multiplex means to delete the empty bits from the middle order group data signals, and
   clock generating means for supplying timing clocks required by the above means, the demultiplexing in the plurality of second demultiplex means being performed based on a common timing clock related to the timing clock used in the multiplexing in the second multiplex means.

14. An apparatus according to claim 13, wherein the second demultiplex means operates in synchronization with a basic clock signal generated by the clock generating means, the first demultiplex means operates in synchronization with a middle order group data clock which is formed by applying speed conversion to a middle order group common clock formed by frequency dividing the basic clock signal extracted from an input high order group data signal, the middle order group data clock being bit synchronized with the middle order group common clock formed by frequency dividing the basic clock signal, but the middle order group data clock including empty bits which are produced at a fixed cycle and the clock rate of the middle order group data clock being lower than the clock rate of the middle order group common clock.

15. An apparatus according to claim 14, further including:
   a plurality of third speed conversion means connected to the first demultiplex means, and
   a plurality of fourth speed conversion means connected to the plurality of second demultiplex means, the third speed conversion means generating the empty bits and the fourth speed conversion means deleting the empty bits, the middle order group data signals having the empty bits and being transferred between the third and fourth speed conversion means synchronized with the middle order group common clock.

16. An apparatus according to claim 15, wherein additional information bits are inserted in the empty bits and the additional information bits include stuffing indication bits.

17. An apparatus according to claim 16, wherein the insertion of the additional information bits is performed by the third speed conversion means, and the fourth speed conversion means deletes the inserted additional information bits, converts the speed, extracts the additional information bits, and supplies the extracted additional information bits for control at the corresponding second demultiplex means.

18. An apparatus according to claim 17, wherein the clock generating means includes a frame timing pulse generating unit, which frame timing pulse generating unit generates a frame timing pulse synchronized with the basic clock signal based on the multiplexing operation in the second multiplex means, generates empty bits in the third speed conversion means synchronized with the frame timing pulse, and inserts additional information bits in the empty bits.

19. An apparatus according to claim 18, wherein the third speed conversion means have a stuffing control unit which receives as input the middle order group common clock and the frame timing pulse and outputs the middle order group data clock.

20. An apparatus according to claim 19, which has, in the third speed conversion means, an additional information bit insertion unit which inserts additional information bits into the empty bits in the middle order group data clock generated in the stuffing control unit and which transmits the middle order group data signal synchronized with the middle order group common clock to the corresponding fourth speed conversion means.

21. An apparatus according to claim 20, which has, in the fourth speed conversion means, an additional information deletion unit which deletes additional information bits from the middle order group data signal received from the corresponding third speed conversion means, an additional information bit extraction unit which extracts additional information bits from the middle order group data signal, a stuffing detection unit which detects stuffing based on the extracted additional information bits, and a destuffing control unit which performs destuffing on the middle order group data signal passing through the additional information deletion unit based on the detected stuffing.

22. An apparatus according to claim 21, which is provided with a jitter removing variable slot at a part of a data bit train having at its head a stuffing indication bit, the variable slot being used as the control bit for the jitter removal when a stuffing request is generated in the corresponding third speed conversion means and being used as the data bit forming part of the data bit train when the stuffing request is generated.

23. An apparatus according to claim 22, wherein the third speed conversion means comprises:
a first frequency divider and a second frequency divider connected in cascade, the first frequency divider receiving the middle order group common clock and frame timing pulse and the second frequency divider receiving at least the frame timing pulse,
a flip flop which receives the output of the second frequency divider as a clock input and is set by the generation of the stuffing request,
a first variable slot pulse generator which receives as input the output of the second frequency divider, the middle order group common clock, and the output of the flip flop, and
a first OR gate which receives as input the output of the first variable slot pulse generator, the middle order group common clock, and the output of the first frequency divider,
a phase comparator which receives the output of the first OR gate and the write clock synchronized with the middle order group data clock supplied from the first demultiplex means, compares the phase of the output of the first OR gate and the write clock, based on the results of the comparison generates the stuffing request when the phase deviation is large, and sets the stuffing request pulse in the flip flop,
a memory which stores middle order group data signals supplied from the first demultiplex means by the write clock and is read out by the output of the first OR gate,
a first AND gate which receives as input the output of the flip flop and the output of the first frequency divider, and
a multiplexer unit which multiplexes the output of the first AND gate, the output of the first variable slot pulse generator, and the middle order group data signal read out from the memory,
the output of the multiplexer unit being supplied to the corresponding fourth speed conversion means.

24. An apparatus according to claim 23, wherein the fourth speed conversion means each is comprised of:
a third frequency divider and a fourth frequency divider which respectively receive the middle order group common clock and frame timing pulse and are connected in cascade,
a second variable slot pulse generator which receives as input the output of the fourth frequency divider and the middle order group common clock,
a second AND gate which receives as input the output of the third frequency divider and the middle order group data signal from the third speed conversion means,
an additional information bit detector which receives the output of the second AND gate and detects the additional information bits,
a third AND gate which receives as input the detection output from the additional information bit detector and the output of the second variable slot pulse generator, and
a second OR gate which receives as input the output of the third AND gate, the output of the third frequency divider, and the middle order group common clock,
the output from the second OR gate being used as the middle order group data clock and supplied together with the middle order group data signal to the second demultiplex means.

25. An apparatus according to claim 15, wherein the second multiplex means operates in synchronization with the basic clock signal generated by the clock generating means, the first multiplex means operates in synchronization with the middle order group data clock formed by applying speed conversion to the middle order group common clock formed by frequency dividing the basic clock signal, the middle order group data clock being bit synchronized with the middle order group common clock, but the middle order group data clock including empty bits which are produced at a fixed cycle and the clock rate of the middle order group data clock being lower than the clock rate of the middle order group common clock.

26. A complex multiplexer apparatus, said apparatus comprising:
- a first multiplexer to convert a plurality of input low order group data signals into a plurality of middle order group data signals,
- a second multiplexer to convert the pluality of middle order group data signals into high order group data signals,
- a first speed converter connected to said first multiplexer to insert empty bits in the middle order group data signal,
- a second speed converter connected to said second multiplexer to delete the empty bits from the middle order group data signal, and
- a clock source to supply a basic clock signal as a time base for the multiplexer apparatus.

27. An apparatus according to claim 26, wherein said second multiplexer operates in synchronization with the basic clock signal generated by the clock source, said first multiplexer operates in synchronization with a middle order group data clock formed by speed conversion by said first speed converter of a middle order group common clock formed by frequency dividing the basic clock signal, the middle order group data clock having a clock rate lower than the clock rate of the middle order group common clock.

28. An apparatus according to claim 26, wherein said first speed converter inserts additional information bits in the empty bits and the additional information bits include stuffing indication bits.

29. An apparatus according to claim 28, wherein said second speed converter deletes the inserted additional information bits, converts the speed, extracts the additional information bits, and supplies the extracted additional information bits for control at said second multiplexer.

30. An apparatus according to claim 29, wherein the clock source includes a frame timing pulse generating unit to generate a frame timing pulse synchronized with the basic clock signal based on said second multiplexer.

31. A complex demultiplexer apparatus, said apparatus comprising:
- a first demultiplexer to convert an input high order group data signal into a plurality of middle order group data signals,
- a second demultiplexer to convert the plurality of middle order group data signals into a plurality of low order group data signals,
- a first speed converter connected to said first demultiplexer to insert empty bits in the middle order group data signal,
- a second speed converter connected to said second demultiplexer to delete the empty bits from the middle order group data signal, and
- a clock source to supply a basic clock signal as a time base for the demultiplexer apparatus.

32. An apparatus according to claim 31, wherein said second demultiplexer operates in synchronization with the basic clock signal generated by the clock source, said first demultiplexer operates in synchronization with a middle order group data clock which is formed by applying speed conversion in said first speed converter to a middle order group common clock formed by frequency dividing the basic clock signal, the middle order group data clock having a clock rate lower than the clock rate of the middle order group common clock.

33. An apparatus according to claim 31, wherein said first speed converter inserts additional information bits in the empty bits and the additional information bits include stuffing indication bits.

34. An apparatus according to claim 33, wherein said second speed converter deletes the inserted additional information bits, converts the speed, extracts the additional information bits, and supplies the extracted additional information bits for control at said second demultiplexer.

35. An apparatus according to claim 34, wherein the clock source includes a frame timing pulse generating unit to generate a frame timing pulse synchronized with the basic clock signal based on the said second multiplexer.

36. An apparatus according to claim 35, wherein said first speed converter includes a stuffing control unit receiving as input the middle order group common clock and the frame timing pulse and outputting the middle order group data clock.

37. An apparatus according to claim 36, wherein said first speed converter includes an additional information bit insertion unit to insert additional information bits into the empty bits in the middle order group data clock generated in the stuffing control unit and to transmit the middle order group data signal synchronized with the middle order group common clock to said second speed converter.

38. An apparatus according to claim 37, wherein the second speed converter includes:
- an additional information deletion unit to delete additional information bits from the middle order group data signal received from said first speed converter,
- an additional information bit extraction unit to extract additional information bits from the middle order group data signal,
- a stuffing detection unit to detect stuffing based on the extracted additional information bits, and
- a destuffing control unit to perform destuffing on the middle order group data signal passing through the additional information deletion unit based on the detected stuffing.

* * * * *

UNITED STATES PATENT AND TRADEMARK OFFICE
CERTIFICATE OF CORRECTION

PATENT NO.  : 5,001,711
DATED       : March 19, 1991
INVENTOR(S) : Yuki Obana et al.

It is certified that error appears in the above-identified patent and that said Letters Patent is hereby corrected as shown below:

Figure 1 should have "PRIOR ART" listed above "Fig. 1".

Figure 2 should have "PRIOR ART" listed above "Fig. 2".

Column 2, line 38, delete "of".

Column 4, line 4, delete "15".

Column 6, line 30, after "channels" insert --send--.

Column 7, line 51, before "order" insert --second--.

Column 15, line 13, change "an" to --An--.

Column 15, line 46, change "an" to --An--.

Signed and Sealed this

Twenty-seventh Day of October, 1992

*Attest:*

DOUGLAS B. COMER

*Attesting Officer*    *Acting Commissioner of Patents and Trademarks*